United States Patent
Jo et al.

(10) Patent No.: US 12,022,392 B2
(45) Date of Patent: Jun. 25, 2024

(54) METHOD FOR PERFORMING DISCONTINUOUS RECEPTION BY TERMINAL IN WIRELESS COMMUNICATION SYSTEM, AND TERMINAL USING SAME METHOD

(71) Applicant: LG ELECTRONICS INC., Seoul (KR)

(72) Inventors: Soonki Jo, Seoul (KR); Yunjung Yi, Seoul (KR); Daesung Hwang, Seoul (KR); Inkwon Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 549 days.

(21) Appl. No.: 17/280,816

(22) PCT Filed: Sep. 27, 2019

(86) PCT No.: PCT/KR2019/012614
§ 371 (c)(1),
(2) Date: Mar. 26, 2021

(87) PCT Pub. No.: WO2020/067783
PCT Pub. Date: Apr. 2, 2020

(65) Prior Publication Data
US 2021/0410069 A1  Dec. 30, 2021

(30) Foreign Application Priority Data
Sep. 27, 2018 (KR) .................. 10-2018-0115306

(51) Int. Cl.
*H04B 7/185* (2006.01)
*H04W 52/02* (2009.01)
(Continued)

(52) U.S. Cl.
CPC ... *H04W 52/0232* (2013.01); *H04W 72/0453* (2013.01); *H04W 72/23* (2023.01); *H04L 5/0051* (2013.01); *H04W 76/28* (2018.02)

(58) Field of Classification Search
CPC ............ H04W 52/0232; H04W 72/23; H04W 72/0453
(Continued)

(56) References Cited

U.S. PATENT DOCUMENTS

2018/0145800 A1  5/2018  Srivastav et al.
2018/0270756 A1  9/2018  Bhattad et al.
(Continued)

FOREIGN PATENT DOCUMENTS

KR  1020140016892  2/2014
KR  1020160065878  6/2016

OTHER PUBLICATIONS

PCT International Application No. PCT/KR2019/012614, International Search Report dated Jan. 8, 2020, 4 pages.
(Continued)

*Primary Examiner* — Temica M Beamer
(74) *Attorney, Agent, or Firm* — LEE, HONG, DEGERMAN, KANG & WAIMEY

(57) ABSTRACT

A method for performing discontinuous reception (DRX) by a terminal in a wireless communication system is proposed. The method comprises: receiving a wake-up signal from a network; and monitoring a physical downlink control channel (PDCCH) on the basis of the wake-up signal.

13 Claims, 36 Drawing Sheets

(51) Int. Cl.
*H04W 72/0453* (2023.01)
*H04W 72/23* (2023.01)
*H04L 5/00* (2006.01)
*H04W 76/28* (2018.01)

(58) Field of Classification Search
USPC .......................................................... 370/318
See application file for complete search history.

(56) References Cited

U.S. PATENT DOCUMENTS

| | | |
|---|---|---|
| 2019/0053320 A1* | 2/2019 | Islam ................ H04W 52/0229 |
| 2019/0159128 A1* | 5/2019 | Lin ........................ H04W 68/00 |
| 2020/0029302 A1* | 1/2020 | Cox ...................... H04W 68/02 |
| 2021/0185614 A1* | 6/2021 | Zhou ..................... H04L 5/0051 |
| 2021/0314866 A1* | 10/2021 | Lee ................... H04W 52/0229 |

OTHER PUBLICATIONS

3rd Generation Partnership Project (3GPP), "Technical Specification Group Radio Access Network; NR; Physical channels and modulation (Release 15)," 3GPP TS 38.211 V15.2.0, Jun. 2018, 96 pages.

\* cited by examiner (a)

$$F = \begin{bmatrix} 1 & 0 \\ 1 & 1 \end{bmatrix}$$

(b)

METHOD FOR PERFORMING DISCONTINUOUS RECEPTION BY TERMINAL IN WIRELESS COMMUNICATION SYSTEM, AND TERMINAL USING SAME METHOD

CROSS-REFERENCE TO RELATED APPLICATIONS

This application is the National Stage filing under 35 U.S.C. 371 of International Application No. PCT/KR2019/012614, filed on Sep. 27, 2019, which claims the benefit of earlier filing date and right of priority to Korean Application No. 10-2018-0115306 filed on Sep. 27, 2018, the contents of which are all hereby incorporated by reference herein in their entirety.

BACKGROUND OF THE DISCLOSURE

Field of the Disclosure

The present disclosure relates to wireless communication.

Related Art

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

In the NR technology, power-saving features of a UE are considered very important, and it is essential to configure an appropriate DRX interval to minimize power consumption of the UE. If a UE is not awake when it has to receive a signal, power consumption may be reduced, but it is difficult to perform communication smoothly. Therefore, when a UE is in a DRX state, a wake-up signal to operate the UE is needed.

In designing signaling of a wake-up signal, it is important to correctly command the wake-up timing for a UE to wake up. Also, in the case of Carrier Aggregation (CA), a wake-up signal has to be transmitted correctly for each carrier, and when a UE group also needs to wake up simultaneously, a wake-up signal should be transmitted on a group basis. Accordingly, the present disclosure proposes a method for signaling a wake-up signal by a base station for efficient power consumption of a UE.

SUMMARY

A technical object of the present disclosure is to provide a discontinuous reception method performed by a UE in a wireless communication system and a UE using the method.

In one aspect, a discontinuous reception (DRX) method in a wireless communication system is provided. The method is performed by a user equipment (UE) and comprises: receiving a wake-up signal from a network; and performing Physical Downlink Control Channel (PDCCH) monitoring based on the wake-up signal on a specific carrier or a specific cell, wherein the wake-up signal informs of the specific carrier or the specific cell on which the PDCCH monitoring is performed by the UE.

The specific carrier or the specific cell may be included respectively in a plurality of carriers or in a plurality of cells used by the UE.

A sequence of the wake-up signal may be different for each of the specific cells informed by the wake-up signal.

The sequence may be determined based on a synchronization signal block (SSB) index and a half frame number.

The sequence may be determined based on a variable determined based on the SSB index and the half frame number, and the variable may be pre-defined.

The sequence may be determined based on a variable determined based on the SSB index and the half frame number, and information related to the variable may be received by the UE from the network.

The sequence may be determined based on a physical cell identifier.

The sequence of the wake-up signal may be determined based on a sequence of a demodulation reference signal (DMRS) of a physical broadcast channel (PBCH).

The sequence of the wake-up signal may be determined based on a sequence of a channel state information-reference signal (CSI-RS).

The wake-up signal may be UE-specific.

A time-frequency resource to which the wake-up signal may be allocated is different for each UE.

The UE may perform wake-up signal monitoring before entering an on-duration period, and based on the wake-up signal being received based on the wake-up signal monitoring, the PDCCH monitoring may be performed in the on-duration period related to the wake-up signal.

The specific carrier or the specific cell may correspond respectively to a carrier set to which one or more carriers used by the UE belong or a cell set to which one or more cells used by the UE belong.

In another aspect, provided is User Equipment (UE) comprising: a transceiver transmitting and receiving a wireless signal; and a processor operating by being combined with the transceiver, wherein the processor is configured to: receive a wake-up signal from a network; and perform Physical Downlink Control Channel (PDCCH) monitoring based on the wake-up signal on a specific carrier or a specific cell, wherein the wake-up signal informs of the specific carrier or the specific cell on which the PDCCH monitoring is performed by the UE.

The UE may communicate with at least one of a mobile terminal, a network, and a self-driving vehicle other than the UE.

Advantageous Effects

According to the present disclosure, a transmission and reception operation of a UE more power-efficient than existing methods is guaranteed.

DESCRIPTION OF EXEMPLARY EMBODIMENTS

In what follows, "/" and "," should be considered to mean "and/or". For example, "A/B" may mean "A and/or B". Furthermore, "A, B" may mean "A and/or B". Furthermore, "AB/C" may mean "at least one of A, B, and/or C". Furthermore, "A, B, C" may mean "at least one of A, B, and/or C".

Furthermore, in what follows, "or" should be considered to mean "and/or". For example, "A or B" may include "only A", "only B", and/or "both A and B". In other words, in what follows, "or" should be considered to mean "additionally or alternatively".

Figure 1:
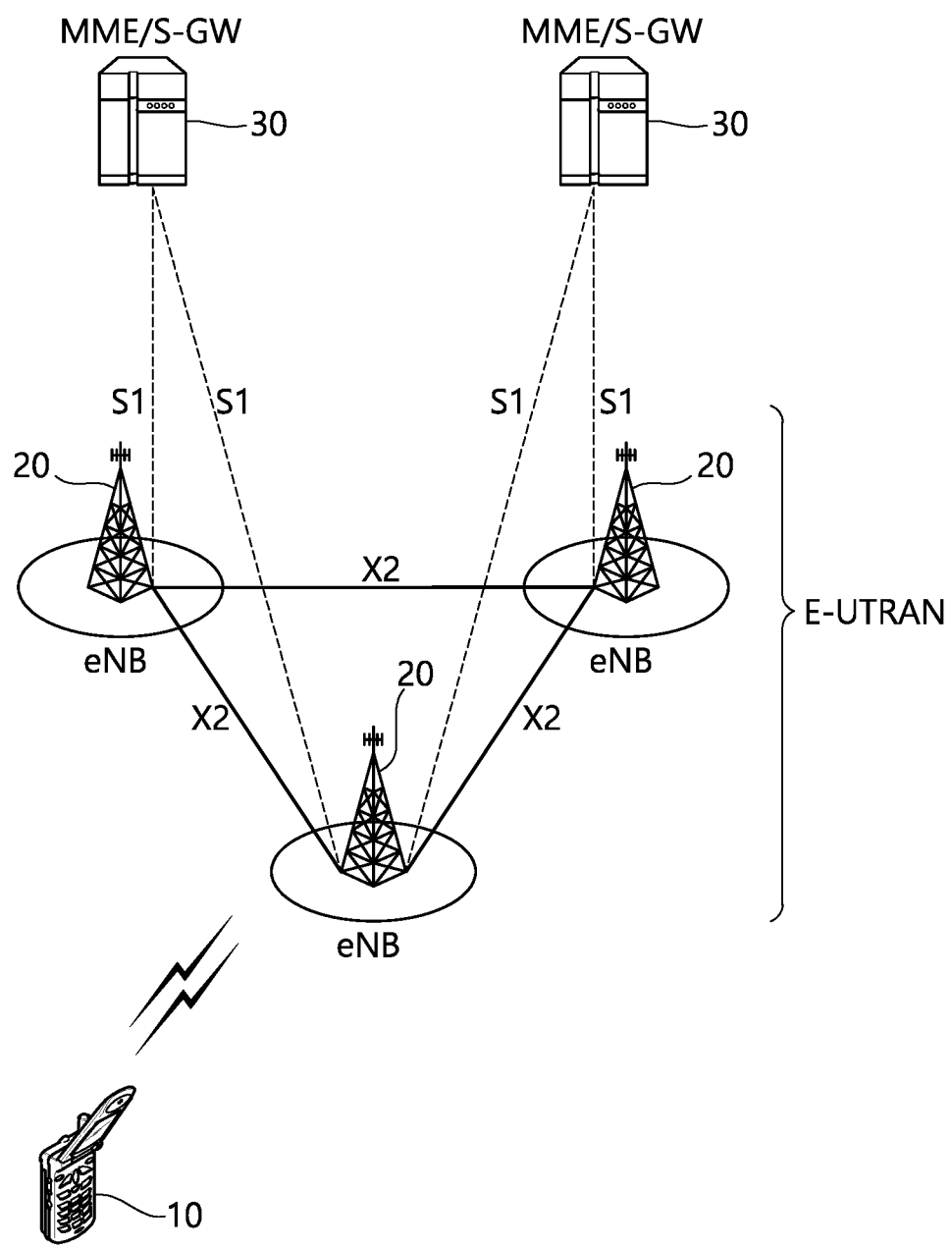
FIG. 1 shows a wireless communication system to which the present disclosure may be applied.

FIG. 1 shows a wireless communication system to which the present disclosure may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
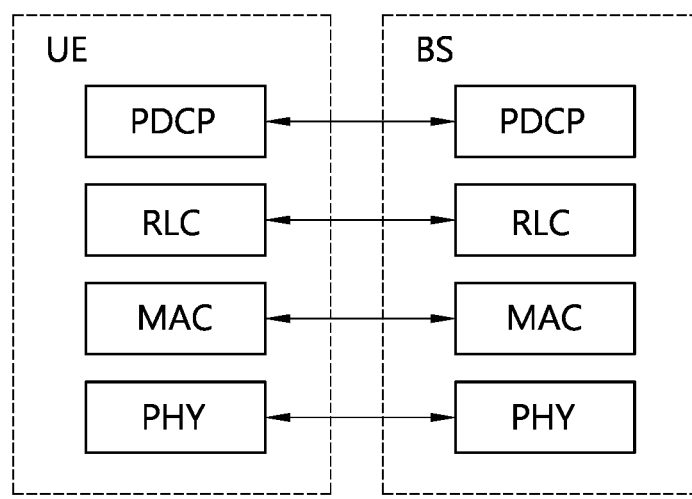
FIG. 2 is a diagram showing a wireless protocol architecture for a user plane.
Figure 3:
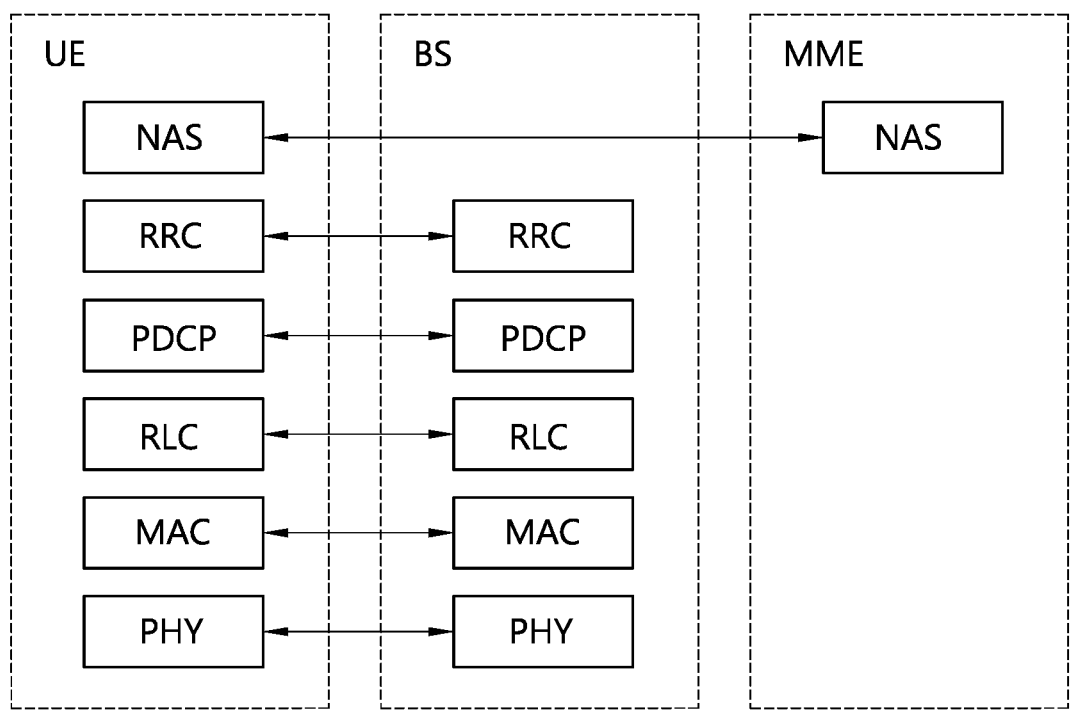
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

Figure 4:
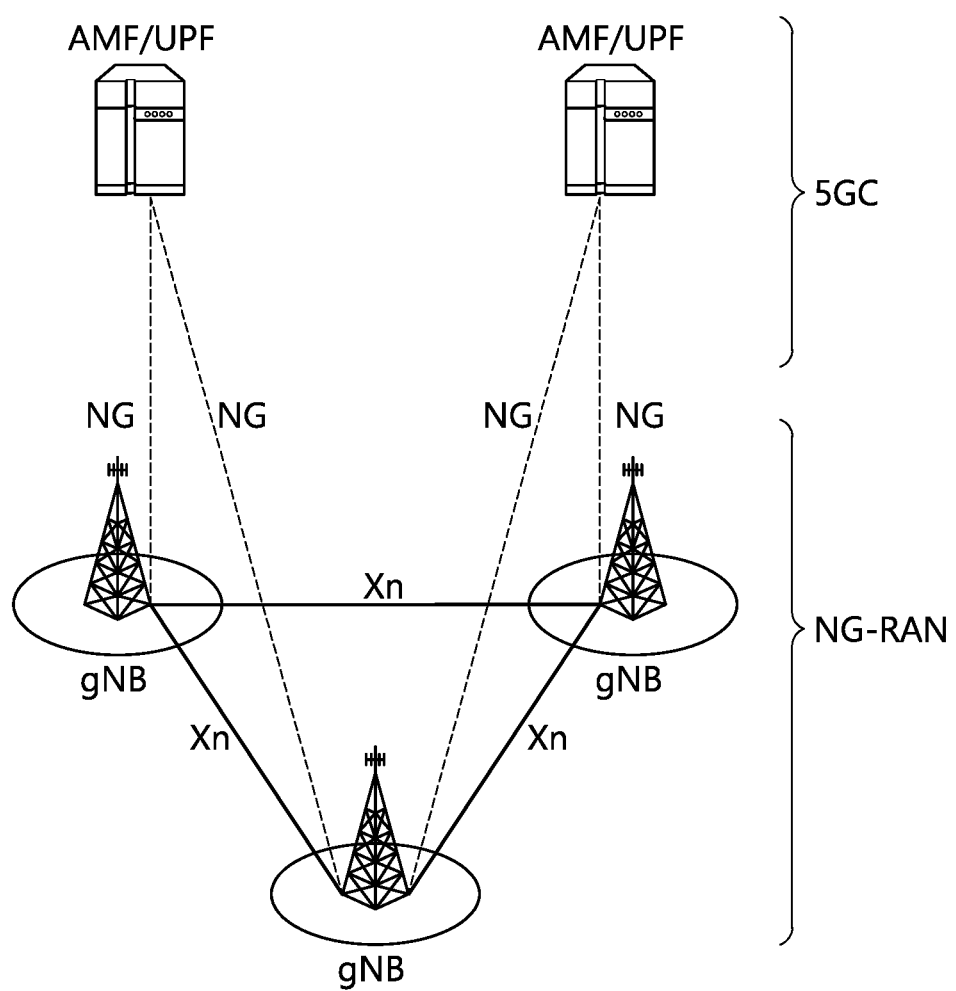
FIG. 4 illustrates a system structure of a next generation radio access network (NG-RAN) to which NR is applied.

FIG. 4 illustrates a system structure of a next generation radio access network (NG-RAN) to which NR is applied.

Referring to FIG. 4, the NG-RAN may include a gNB and/or an eNB that provides user plane and control plane protocol termination to a terminal. FIG. 4 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

Figure 5:
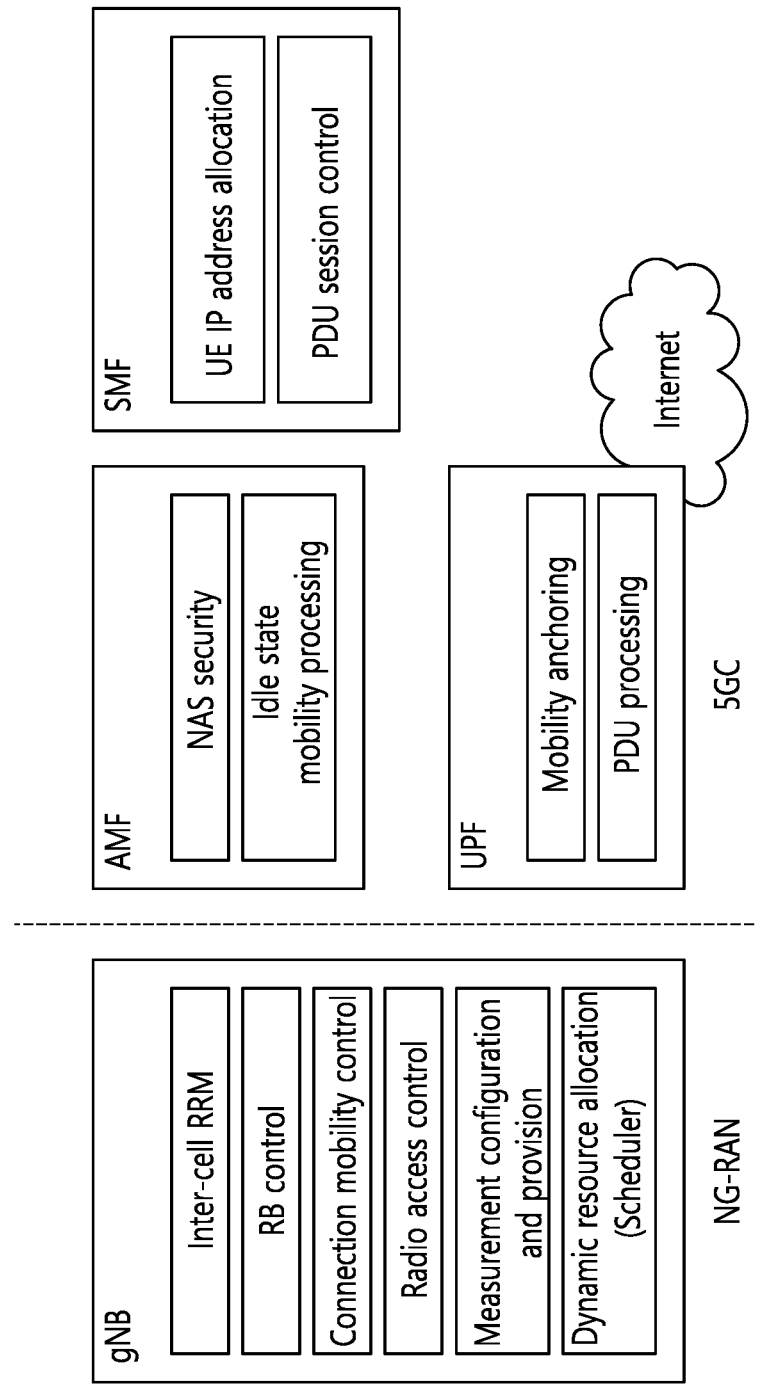
FIG. 5 illustrates a functional division between an NG-RAN and a 5GC.

FIG. 5 illustrates a functional division between an NG-RAN and a 5GC.

The gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
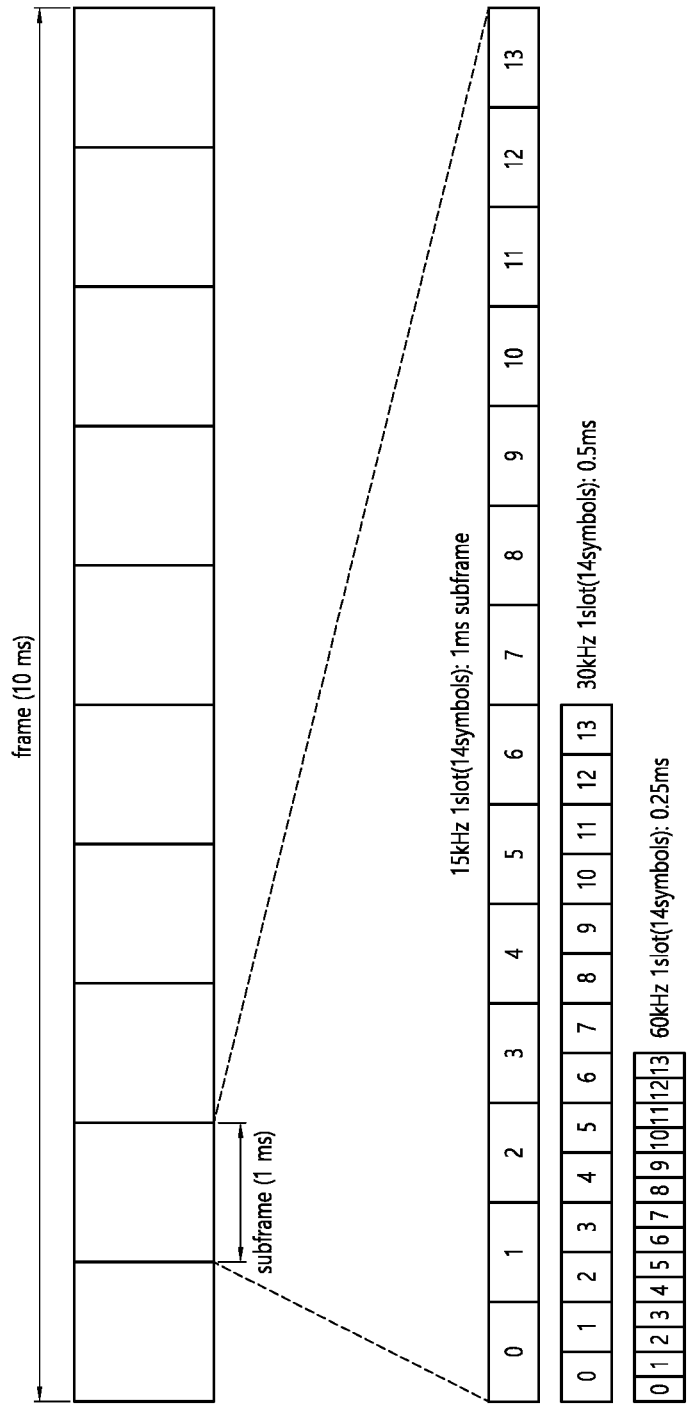
FIG. 6 illustrates an example of a frame structure that may be applied in NR.

FIG. 6 illustrates an example of a frame structure that may be applied in NR.

Referring to FIG. 6, a frame may be composed of 10 milliseconds (ms) and include 10 subframes each composed of 1 ms.

One or a plurality of slots may be included in a subframe according to subcarrier spacings.

The following table 1 illustrates a subcarrier spacing configuration μ.

TABLE 1

| μ | $\Delta f = 2^\mu \cdot 15[\text{kHz}]$ | Cyclic prefix |
|---|---|---|
| 0 | 15 | Normal |
| 1 | 30 | Normal |
| 2 | 60 | Normal Extended |
| 3 | 120 | Normal |
| 4 | 240 | Normal |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations μ.

TABLE 2

| μ | $N^{slot}_{symb}$ | $N^{frame, \mu}_{slot}$ | $N^{subframe, \mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

In FIG. 6, μ=0, 1, 2 is illustrated.

A physical downlink control channel (PDCCH) may include one or more control channel elements (CCEs) as illustrated in the following table 3.

TABLE 3

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Meanwhile, in a future wireless communication system, a new unit called a control resource set (CORESET) may be introduced. The terminal may receive the PDCCH in the CORESET.

Figure 7:
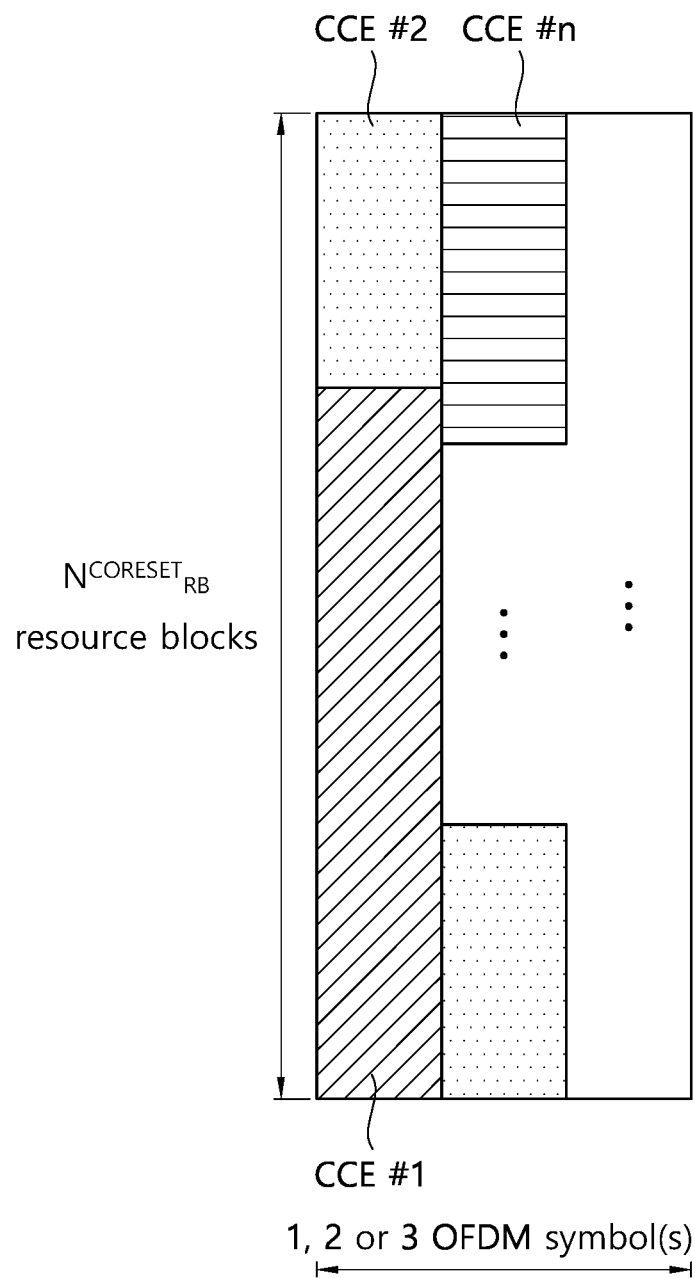
FIG. 7 illustrates CORESET.

FIG. 7 illustrates CORESET.

Referring to FIG. 7, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 7, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the terminal.

Figure 8:
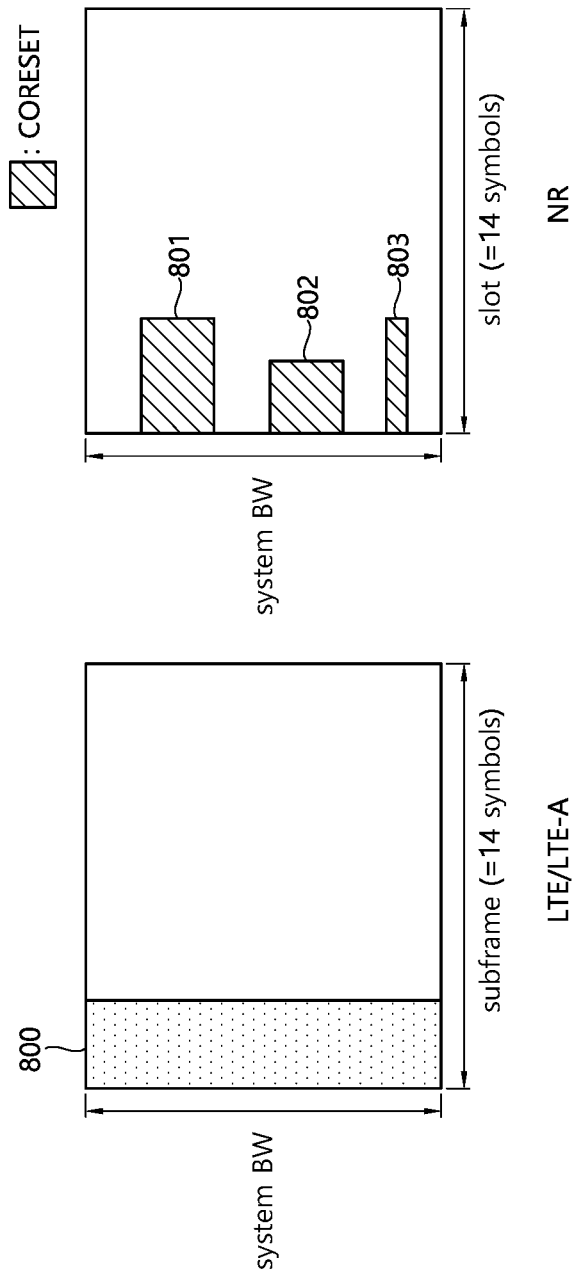
FIG. 8 is a diagram illustrating a difference between a related art control region and the CORESET in NR.

FIG. 8 is a diagram illustrating a difference between a related art control region and the CORESET in NR.

Referring to FIG. 8, a control region 800 in the related art wireless communication system (e.g., LTE/LTE-A) is configured over the entire system band used by a base station (BS). All the terminals, excluding some (e.g., eMTC/NB-IoT terminal) supporting only a narrow band, must be able to receive wireless signals of the entire system band of the BS in order to properly receive/decode control information transmitted by the BS.

On the other hand, in NR, CORESET described above was introduced. CORESETs 801, 802, and 803 are radio resources for control information to be received by the terminal and may use only a portion, rather than the entirety of the system bandwidth. The BS may allocate the CORESET to each UE and may transmit control information through the allocated CORESET. For example, in FIG. 8, a first CORESET 801 may be allocated to UE 1, a second CORESET 802 may be allocated to UE 2, and a third CORESET 803 may be allocated to UE 3. In the NR, the terminal may receive control information from the BS, without necessarily receiving the entire system band.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

In NR, the following technologies/features can be applied.

<Self-Contained Subframe Structure>

Figure 9:
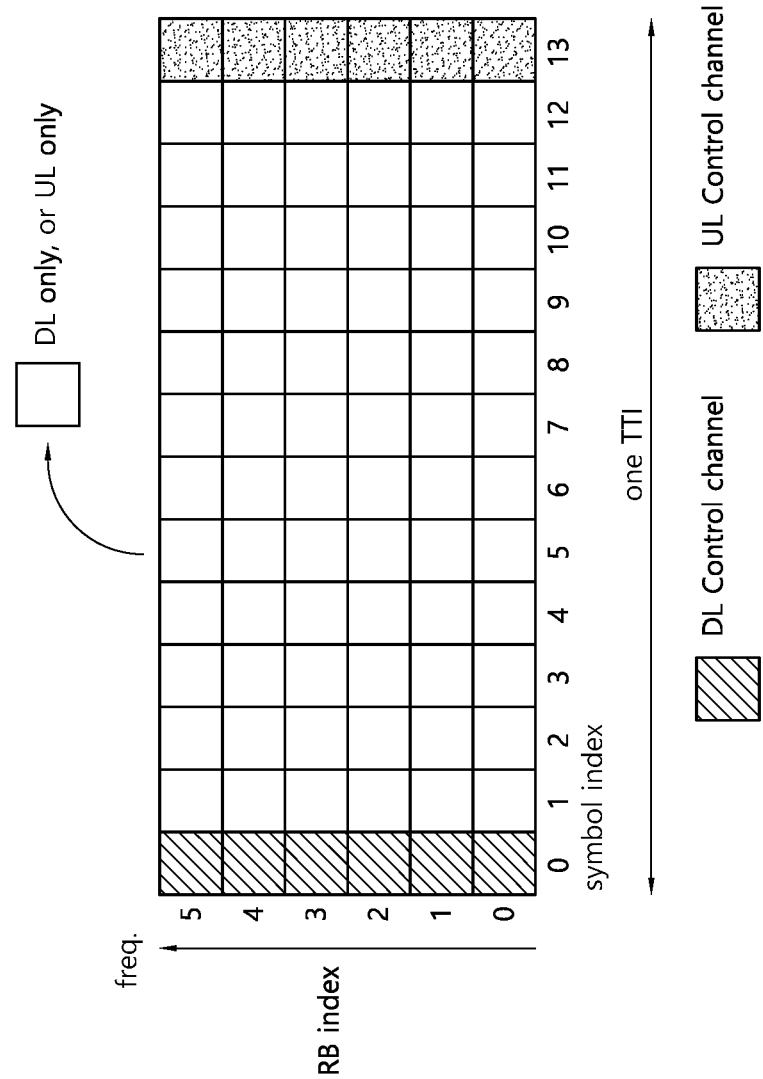
FIG. 9 illustrates an example of a frame structure for new radio access technology.

FIG. 9 illustrates an example of a frame structure for new radio access technology.

In NR, a structure in which a control channel and a data channel are time-division-multiplexed within one TTI, as shown in FIG. 9, can be considered as a frame structure in order to minimize latency.

In FIG. 9, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this data and control TDMed subframe structure, a time gap for a base station and a terminal to switch from a transmission mode to a reception mode or from the reception mode to the transmission mode may be required. To this end, some OFDM symbols at a time when DL switches to UL may be set to a guard period (GP) in the self-contained subframe structure.

<Analog Beamforming #1>

Wavelengths are shortened in millimeter wave (mmW) and thus a large number of antenna elements can be installed in the same area. That is, the wavelength is 1 cm at 30 GHz and thus a total of 100 antenna elements can be installed in the form of a 2-dimensional array at an interval of 0.5 lambda (wavelength) in a panel of 5×5 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

<Analog Beamforming #2>

When a plurality of antennas is used in NR, hybrid beamforming which is a combination of digital beamforming and analog beamforming is emerging. Here, in analog beamforming (or RF beamforming) an RF end performs precoding (or combining) and thus it is possible to achieve the performance similar to digital beamforming while reducing the number of RF chains and the number of D/A (or A/D) converters. For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

Figure 10:
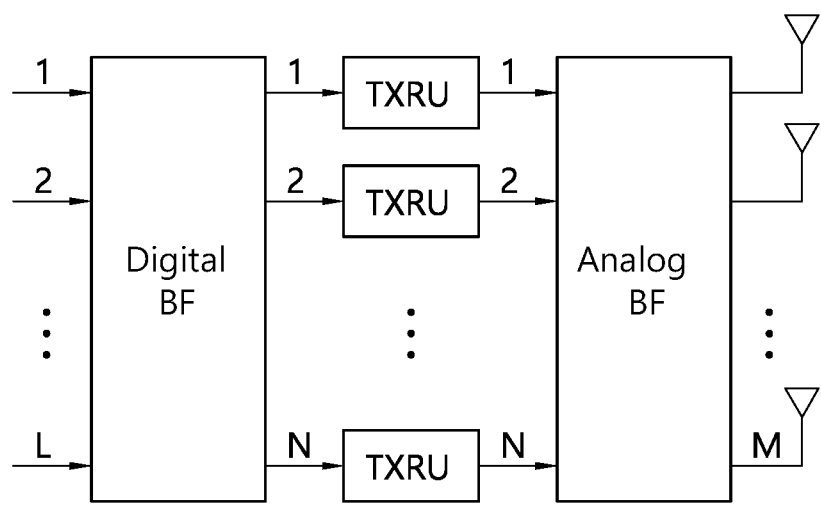
FIG. 10 is an abstract schematic diagram illustrating hybrid beamforming from the viewpoint of TXRUs and physical antennas.

FIG. 10 is an abstract schematic diagram illustrating hybrid beamforming from the viewpoint of TXRUs and physical antennas.

In FIG. 10, the number of digital beams is L and the number of analog beams is N. Further, in the NR system, by designing the base station to change the analog beamforming in units of symbols, it is considered to support more efficient beamforming for a terminal located in a specific area. Furthermore, when defining N TXRUs and M RF antennas as one antenna panel in FIG. 7, it is considered to introduce a plurality of antenna panels to which independent hybrid beamforming is applicable in the NR system.

When a base station uses a plurality of analog beams as described above, analog beams suitable to receive signals may be different for terminals and thus a beam sweeping operation of sweeping a plurality of analog beams to be applied by a base station per symbol in a specific subframe (SF) for at least a synchronization signal, system information and paging such that all terminals can have reception opportunities is considered.

Figure 11:
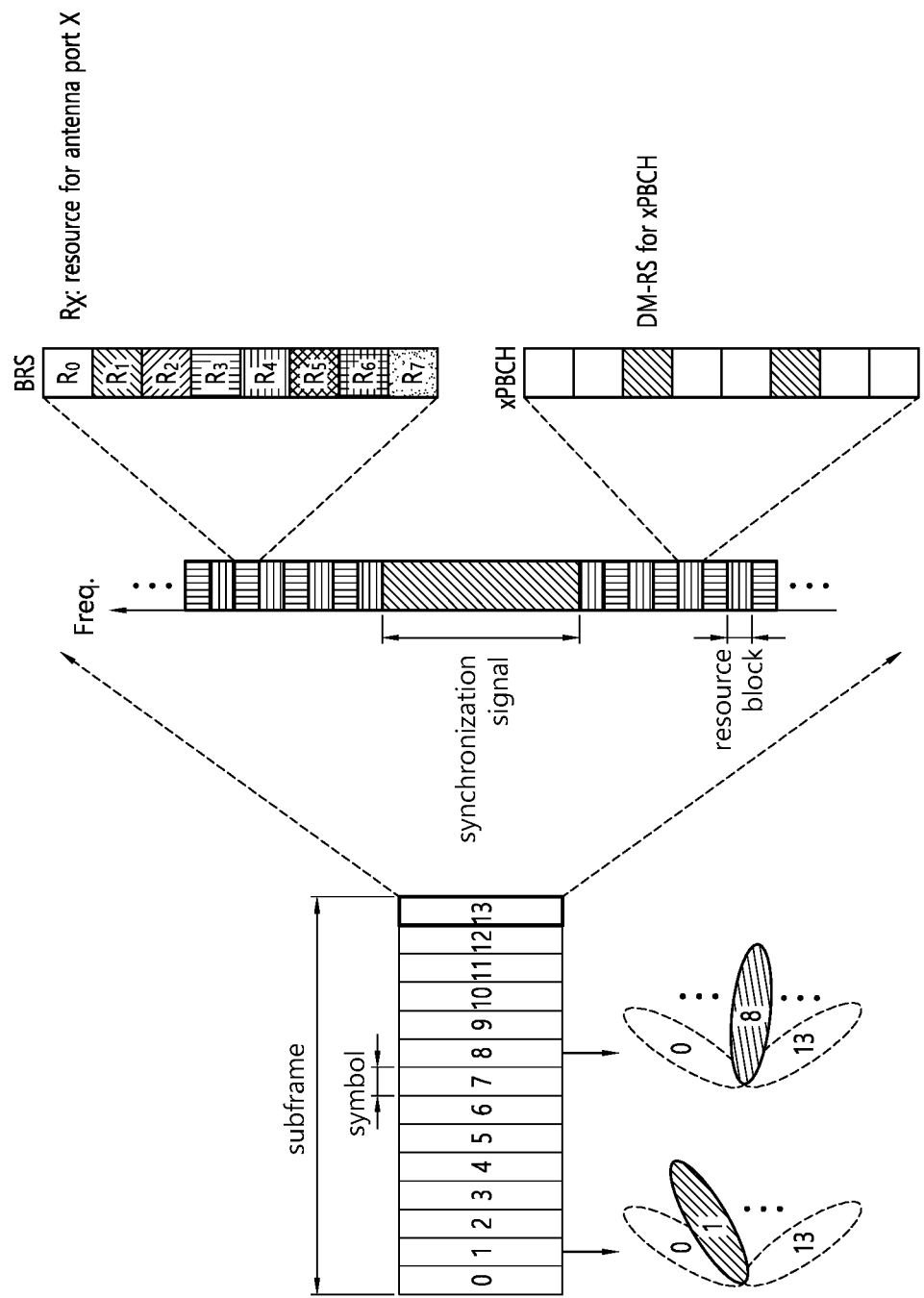
FIG. 11 illustrates the beam sweeping operation for a synchronization signal and system information in a downlink (DL) transmission procedure.

FIG. 11 illustrates the beam sweeping operation for a synchronization signal and system information in a downlink (DL) transmission procedure.

In FIG. 11, physical resources (or a physical channel) in which system information of the NR system is transmitted in a broadcasting manner is referred to as a physical broadcast channel (xPBCH). Here, analog beams belonging to different antenna panels can be simultaneously transmitted within one symbol, and a method of introducing a beam reference signal (BRS) which is a reference signal (RS) to which a single analog beam (corresponding to a specific antenna panel) is applied in order to measure a channel per analog beam, as illustrated in FIG. 8, is under discussion. The BRS can be defined for a plurality of antenna ports, and each antenna port of the BRS can correspond to a single analog beam. Here, all analog beams in an analog beam group are applied to the synchronization signal or xPBCH and then the synchronization signal or xPBCH is transmitted such that an arbitrary terminal can successively receive the synchronization signal or xPBCH.

Figure 12:
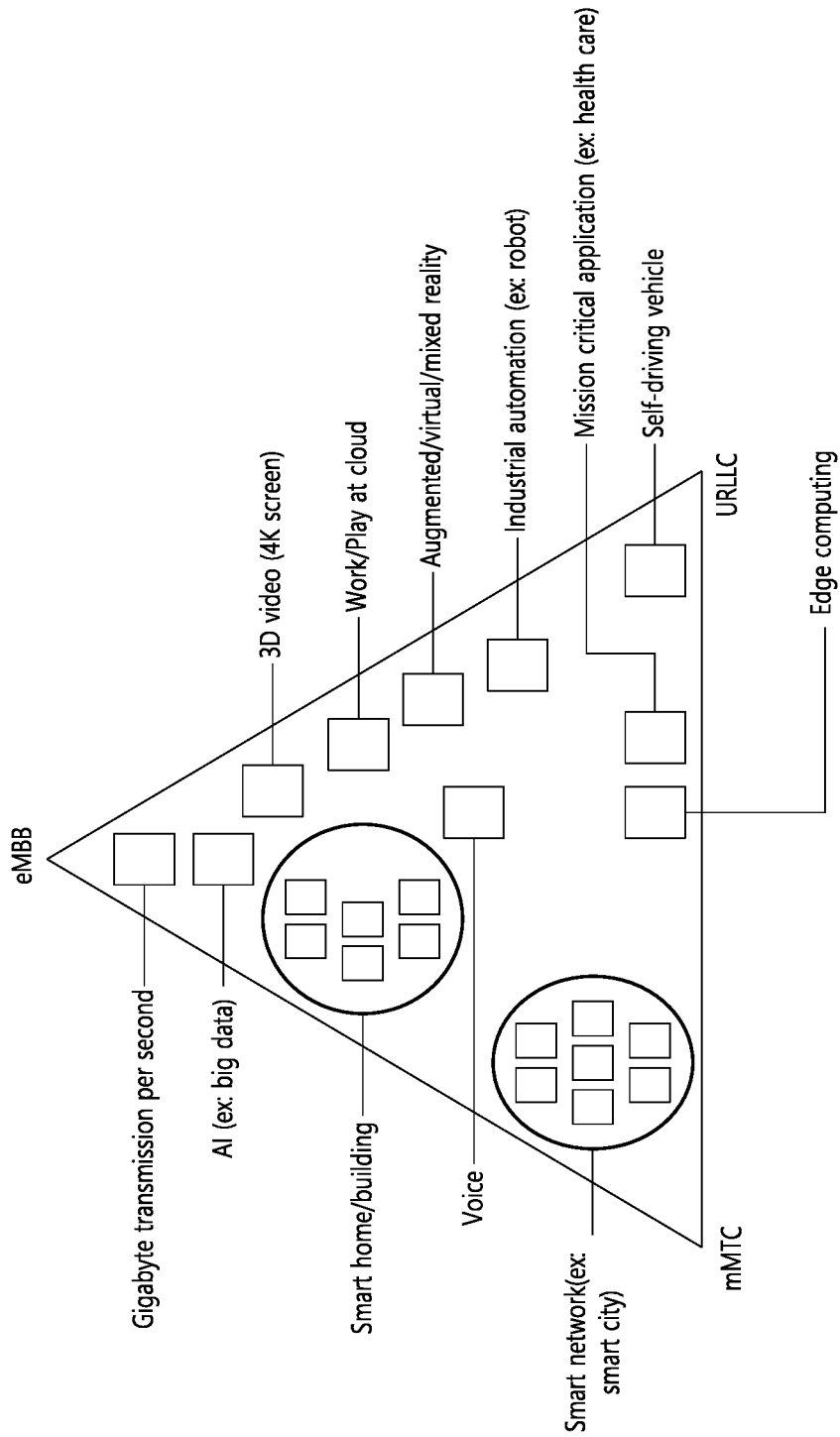
FIG. 12 shows examples of 5G usage scenarios to which the technical features of the present disclosure can be applied.

FIG. 12 shows examples of 5G usage scenarios to which the technical features of the present disclosure can be applied. The 5G usage scenarios shown in FIG. 12 are only exemplary, and the technical features of the present disclosure can be applied to other 5G usage scenarios which are not shown in FIG. 12.

Referring to FIG. 12, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km$^2$. mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 12 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

In what follows, a signal transmission and reception procedure that may be applied according to partial implementation of the present disclosure will be described.

Figure 13:
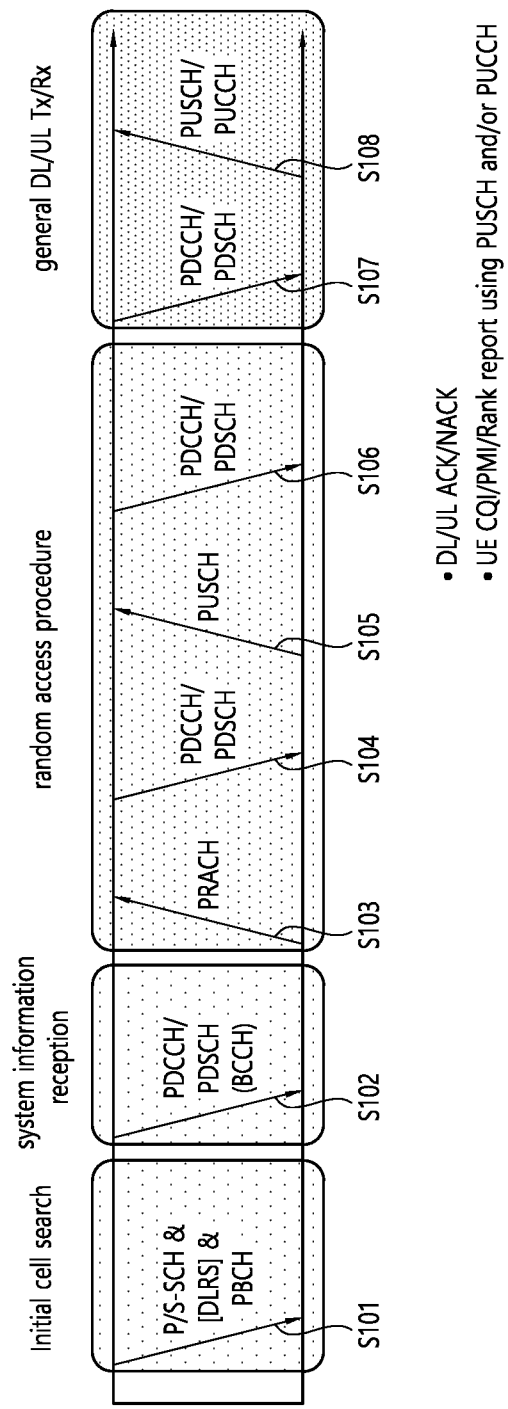
FIG. 13 illustrates a signal transmission and reception procedure that may be applied according to partial implementation of the present disclosure.

FIG. 13 illustrates a signal transmission and reception procedure that may be applied according to partial implementation of the present disclosure.

Referring to FIG. 13, a UE performs an initial cell search S101. During the initial cell search, the UE performs downlink synchronization with a base station by receiving a Primary Synchronization Channel (P-SCH) and a Secondary Synchronization Channel (S-SCH) from the base station and acquires information on a cell ID. Afterward, the UE acquires system information (for example, MIB) through a Physical Broadcast Channel (PBCH). The UE may check the state of a downlink channel by receiving a Downlink Reference Signal (DL RS).

After the initial cell search, the UE may obtain more specific system information (for example, SIB) by receiving a Physical Downlink Control Channel (PDCCH) and a Physical Downlink Control Channel (PDSCH) scheduled by the PDCCH S102.

The UE may perform a random access procedure for uplink synchronization. The UE may transmit a preamble (for example, Msg1) through a Physical Random Access Channel (PRACH) S103 and receive a response message (for example, Msg2) in response to the preamble through the PDCCH and the PDSCH corresponding to the PDCCH S104. In the case of contention-based random access, a contention resolution procedure such as additional PRACH transmission S105 and PDCCH/PDSCH reception S106 may be performed.

Afterward, the UE may perform PDCCH/PDSCH reception S107 and Physical Uplink Shared Channel (PUSCH)/Physical Uplink Control Channel (PUCCH) transmission S108 as a general uplink/downlink signal transmission procedure. The UE may transmit Uplink Control Information (UCI) to the base station. UCI may include Hybrid Automatic Repeat reQuest (HARQ) Acknowledgement (ACK)/Negative-ACK (NACK), Scheduling Request (SR), Channel Quality Indicator (CQI), Precoding Matrix Indicator (PMI) and/or Rank Indication (RI).

In what follows, cell search will be described.

Cell search is a procedure in which a UE obtains time and frequency synchronization to a cell and detects a physical layer cell ID of the cell. To perform the cell search, the UE receives a Primary Synchronization Signal (PSS) and a Secondary Synchronization Signal (SSS).

The cell search procedure for a UE may be summarized as shown in Table 4.

TABLE 4

| | Signal type | Operation |
| --- | --- | --- |
| Step 1 | PSS | * Obtain SS/PBCH block (SSB) symbol timing<br>* Search cell ID group for cell ID (3 hypothesis) |
| Step 2 | SSS | * Detect cell ID group (336 hypothesis) |
| Step 3 | PBCH DMRS | * SSB index and half-frame index (detect slot and frame boundary) |
| Step 4 | PBCH | * Time information (80 ms, SFN, SSB index, HF)<br>* Configure RMSI CORESET/search space |
| Step 5 | PDCCH and PDSCH | * Cell access information |

Figure 14:
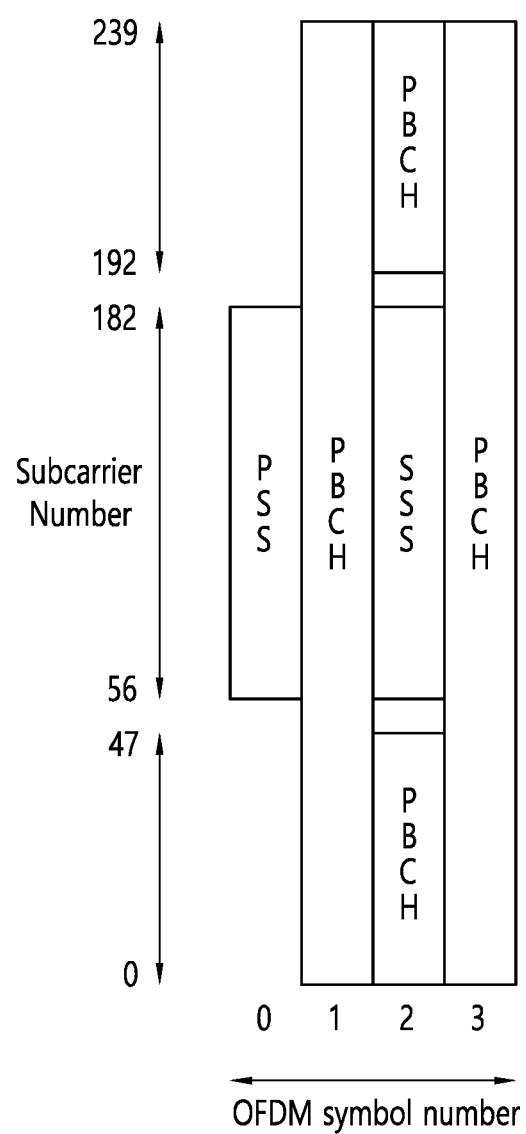
FIG. 14 illustrates a synchronization signal and PBCH (SS/PBCH) block.

FIG. 14 illustrates a synchronization signal and PBCH (SS/PBCH) block.

According to FIG. 14, an SS/PBCH block consists of a PSS and an SSS, each of which occupies one symbol and 127 subcarriers, and PBCHs occupying 3 OFDM symbols and 240 subcarriers, where one of the PBCHs has an unused region left for the SSS in the middle thereof. The periodicity of the SS/PBCH block may be configured by the network, and the time position at which the SS/PBCH block may be transmitted is determined by subcarrier spacing.

Polar coding is used for the PBCH. Unless the network configures a UE to assume a different subcarrier spacing, the UE may assume a band-specific subcarrier spacing for the SS/PBCH block.

PBCH symbols carry their frequency-multiplexed DMRS. QPSK modulation is used for the PBCH.

1008 unique physical layer cell IDs are given by Eq. 1 below.

$$N_{ID}^{cell} = 3N_{ID}^{(1)} + N_{ID}^{(2)} \quad \text{[Eq. 1]}$$

In Eq. 1, $N_{ID}^{(1)} \in \{0, 1, \ldots, 335\}$ and $N_{ID}^{(2)} \in \{0, 1, 2\}$.

Meanwhile, a PSS sequence $d_{PSS}(n)$ for PSS is defined by Eq. 2 as follows.

$$d_{PSS}(n) = 1 - 2x(m) \quad \text{[Eq. 2]}$$

$m = (n + 43 N_{ID}^{(2)}) \bmod 127$ $0 \leq n < 127$

In Eq. 2, $(x(i+7) = (x(i+4) + x(i)) \bmod 2$ and $[x(6) \ x(5) \ x(4) \ x(3) \ x(2) \ x(1) \ x(0)] = [1 \ 1 \ 1 \ 0 \ 1 \ 1 \ 0]$.

The sequence may be mapped to the physical resources shown in FIG. 14.

Meanwhile, an SSS sequence $d_{SSS}(n)$ for SSS is defined by Eq. 3 as follows.

$$d_{SSS}(n) = [1 - 2x_0((n + m_0) \bmod 127)][1 - 2x_1((n + m_1) \bmod 127)] \quad \text{[Eq. 3]}$$

$m_0 = 15 \left\lfloor \frac{N_{ID}^{(1)}}{112} \right\rfloor + 5 N_{ID}^{(2)}$ $m_1 = N_{ID}^{(1)} \bmod 112$ $0 \leq n < 127$.

In Eq. 3, $x_0(i+7) = (x_0(i+4) + x_0(i)) \bmod 2$, $x_1(i+7) = (x_1(i+1) + x_1(i)) \bmod 2$, $[x_0(6) \ x_0(5) \ x_0(4) \ x_0(3) \ x_0(2) \ x_0(1) \ x_0(0)] = [0 \ 0 \ 0 \ 0 \ 0 \ 0 \ 1]$, and $[x_1(6) \ x_1(5) \ x_1(4) \ x_1(3) \ x_1(2) \ x_1(1) \ x_1(0)] = [0 \ 0 \ 0 \ 0 \ 0 \ 0 \ 1]$.

The sequence above may be mapped to the physical resources shown in FIG. 14.

For a half frame having SS/PBCH blocks, first symbol indexes for candidate SS/PBCH blocks may be determined by subcarrier spacing of the SS/PBCH blocks described later.

Case A—subcarrier spacing 15 kHz: The first symbols of candidate SS/PBCH blocks have an index of {2, 8}+14*n. For subcarrier frequencies below or equal to 3 GHz, n=0, 1. For subcarrier frequencies above 3 GHz and below or equal to 6 GHz, n=0, 1, 2, 3.

Case B—subcarrier spacing 30 kHz: The first symbols of candidate SS/PBCH blocks have an index of {4, 8, 16, 20}+28*n. For subcarrier frequencies below or equal to 3 GHz, n=0. For subcarrier frequencies above 3 GHz and below or equal to 6 GHz, n=0, 1.

Case C—subcarrier spacing 30 kHz: The first symbols of candidate SS/PBCH blocks have an index of {2, 8}+14*n. For subcarrier frequencies below or equal to 3 GHz, n=0, 1. For subcarrier frequencies above 3 GHz and below or equal to 6 GHz, n=0, 1, 2, 3.

Case D—subcarrier spacing 120 kHz: The first symbols of candidate SS/PBCH blocks have an index of {4, 8, 16, 20}+28*n. For subcarrier frequencies above 6 GHz, n=0, 1, 2, 3, 5, 6, 7, 8, 10, 11, 12, 13, 15, 16, 17, 18.

Case E—subcarrier spacing 240 kHz: The first symbols of candidate SS/PBCH blocks have an index of {8, 12, 16, 20, 32, 36, 40, 44}+56*n. For subcarrier frequencies above 6 GHz, n=0, 1, 2, 3, 5, 6, 7, 8.

The candidate SS/PBCH blocks within the half-block may be indexed on the time axis in an ascending order starting from 0 to L−1. From one-to-one mapping to the index of a DM-RS sequence transmitted within the PBCH, the UE has to determine 2 LSBs of the SS/PBCH block index for each half-frame when L=4 and 3 LSBs when L>4. When L=64, the UE has to determine 3 MSBs of the SS/PBCH block index for each half-frame according to the PBCH payload bits $\bar{a}_{\bar{A}+5}$, $\bar{a}_{\bar{A}+6}$, and $\bar{a}_{\bar{A}+7}$.

The indexes of SS/PBCH blocks in which the UE is unable to receive other signals or channels within REs overlapping the REs corresponding to the SS/PBCH blocks may be configured for the UE by the upper layer parameter 'SSB-transmitted-SIB1'. Also, the indexes of SS/PBCH blocks for each serving cell, in which the UE is unable to receive other signals or channels within REs overlapping the REs corresponding to the SS/PBCH blocks may be configured by the upper layer parameter 'SSB-transmitted'. Configuration by 'SSB-transmitted' may have a higher priority than configuration by 'SSB-transmitted-SIB1'. The UE may be configured with a periodicity of the half-frame for reception of SS/PBCH blocks for each serving cell by the upper layer parameter 'SSB-periodicityServingCell'. If the UE is not configured with a periodicity of the half-frame for reception of SS/PBCH blocks, the UE may assume a periodicity of the half-frame. The UE may assume that the periodicity is the same for all of SS/PBCH blocks within a serving cell.

Figure 15:
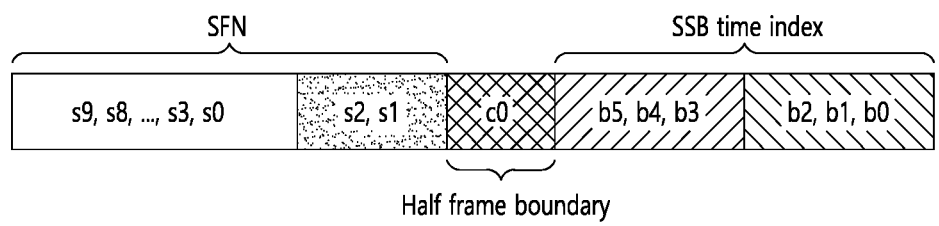
FIG. 15 illustrates a method for obtaining timing information by a UE.

FIG. 15 illustrates a method for obtaining timing information by a UE.

First, the UE may obtain 6-bit SFN information through MasterInformationBlock (MIB) received within PBCH. Also, the UE may obtain 4-bit SFN information within a PBCH transport block.

Secondly, the UE may obtain a 1-bit half-frame indicator as part of a PBCH payload. Below 3 GHz, the half-frame indicator may be signaled implicitly as part of a PBCH DMRS when $L_{max}=4$.

Lastly, the UE may obtain an SS/PBCH block index by the DMRS sequence and the PBCH payload. In other words, the UE may obtain 3-bit LSBs of the SS block index by the DMRS sequence during a period of 5 ms. Also, (above 6 GHz) 3-bit MSBs of timing information are carried explicitly within the PBCH payload.

In the initial cell selection step, the UE may assume that a half-frame having SS/PBCH blocks is generated with a periodicity of 2 frames. If an SS/PBCH block is detected, and $k_{SSB}\leq23$ for FR1 and $k_{SSB}\leq11$ for FR2, the UE determines that there exists a set of control resources for Type0-PDCCH common search space. If $k_{SSB}>23$ for FR1 and $k_{SSB}>11$ for FR2, the UE determines that a set of control resources for the Type0-PDCCH common search space does not exist.

For a serving cell to which no SS/PBCH block is transmitted, the UE obtains time and frequency synchronization to the serving cell based on the reception of SS/PBCH blocks on the PCell or PSCell of a cell group for the serving cell.

In what follows, acquisition of System Information (SI) is described.

The System Information (SI) is divided into MasterInformationBlock (MIB) and a plurality of SystemInformationBlocks (SIBs), where
- The MIB is always transmitted on the BCH with a periodicity of 80 ms and repetitions made within 80 ms, and it includes parameters needed to acquire SystemInformationBlockType1 (SIB1) from the cell;
- SIB1 is transmitted on the DL-SCH with a periodicity and repetitions. SIB1 includes information about availability and scheduling (for example, periodicity and SI-window size) of other Ms. Also, SIB1 indicates whether they (namely, other SIBs) are provided via periodic broadcast basis or only on-demand basis. If other SIBs are provided on-demand, SIB1 includes information required for the UE to perform an SI request;
- SIBs other than the SIB1 are carried by SystemInformation (SI) messages transmitted on the DL-SCH. Each SI message is transmitted within periodically occurring time domain windows (which are referred to as SI-windows);
- For PSCell and SCells, RAN provides the required SI by dedicated signaling. Nevertheless, the UE has to acquire the MIB of the PSCell to get SFN timing (which may be different from MCG) of the SCG. When relevant SI for SCell is changed, RAN releases and adds the concerned SCell. For PSCell, SI may only be changed only through reconfiguration with Sync.

Figure 16:
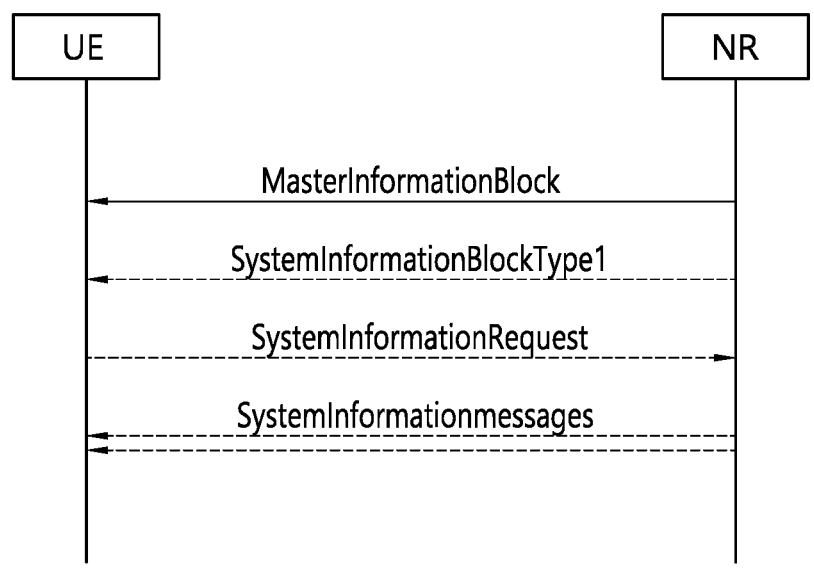
FIG. 16 illustrates one example of a system information acquisition procedure of a UE.

FIG. 16 illustrates one example of a system information acquisition procedure of a UE.

According to FIG. 16, the UE may receive MIB from the network and then may receive SIB1. Afterwards, the UE may transmit a system information request to the network and receive a SystemInformation message from the network in response to the request.

The UE may apply the system information acquisition procedure to acquire Access Stratum (AS) and Non-Access Stratum (NAS) information.

The UE in RRC_IDLE and RRC_INACTIVE state has to ensure having a valid version of (at least) the MIB, SIB1, and SystemInformationBlockTypeX (depending on the support of a concerned RAT for UE controlled mobility).

The UE in the RRC_CONNECTED state has to ensure having a valid version of the MIB, SIB1, and SystemInformationBlockTypeX (depending on the mobility support for a concerned RAT).

The UE has to store relevant SI acquired from a currently camped/serving cell. A version of the SI that the UE has acquired and stored remains valid only for a certain time period. The UE may use such a stored version of the SI, for example, after cell re-selection, upon return from out of coverage or after SI change indication.

In what follows, Random Access (RA) will be described.

A random access procedure for a UE may be summarized as shown in Table 5.

TABLE 5

| | Signal type | Operation/Acquired information |
|---|---|---|
| Step 1 | PRACH preamble of uplink | * Acquisition of initial beam<br>* Random election of RA-preamble ID |
| Step 2 | Random access response on DL-SCH | * Timing array information<br>* RA-preamble ID<br>* Initial uplink grant, temporary C-RNTI |
| Step 3 | Uplink transmission on UL-SCH | * RRC connection request<br>* UE identity |
| Step 4 | Contention resolution of downlink | * C-RNTI on PDCCH for initial access<br>* C-RNTI on PDCCH for UE in the RRC_CONNECTED state |

Figure 17:
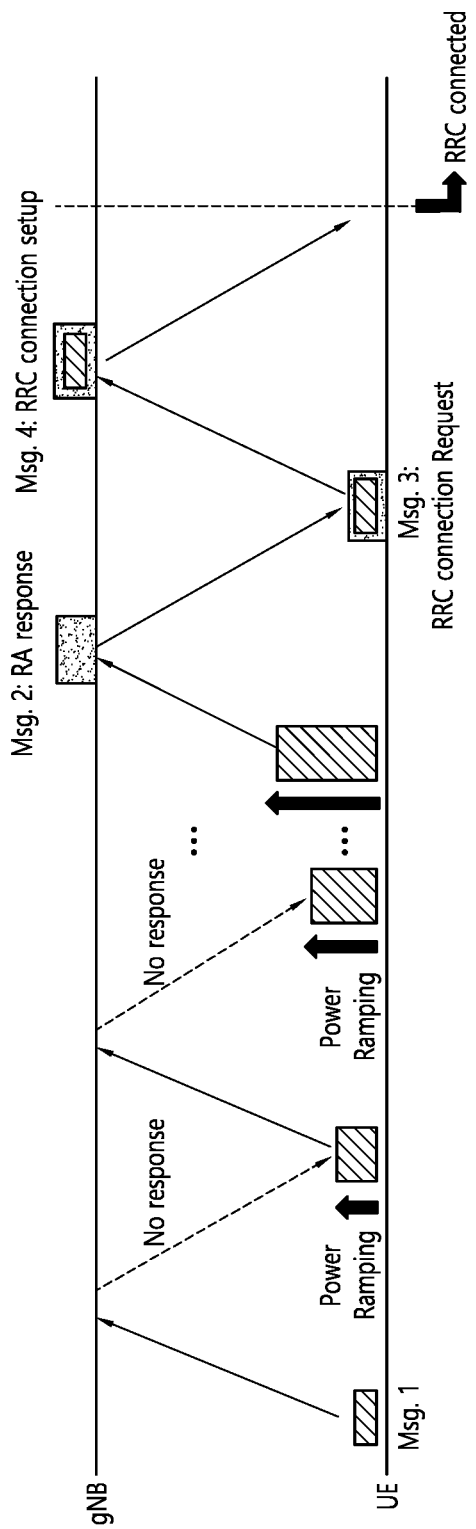
FIG. 17 illustrates a random access procedure.

FIG. 17 illustrates a random access procedure.

Referring to FIG. 17, first, a UE may transmit a PRACH preamble via uplink transmission as message 1 (Msg 1) of the random access procedure.

A random access preamble sequence having two different lengths may be supported. A long sequence of length 839 is applied to the subcarrier spacing of 1.25 kHz and 5 kHz, and a short sequence of length 139 is applied to the subcarrier spacing of 15, 30, 60, and 120 kHz. A long sequence supports an unrestricted set and a restricted set of type A and type B while a short sequence may support only the unrestricted set.

A plurality of RACH preambles may be defined by one or more RACH OFDM symbols, different Cyclic Prefix (CP), and guard time. Configuration of PRACH preamble to be used may be provided to the UE as system information.

When there is no response to Msg 1, the UE may re-transmit a PRACH preamble power-ramped within a specified number of times. The UE calculates PRACH transmission power for retransmission of the preamble based on the most recent estimated path loss and a power ramping counter. If the UE performs beam switching, the power ramping counter does not change.

Figure 18:
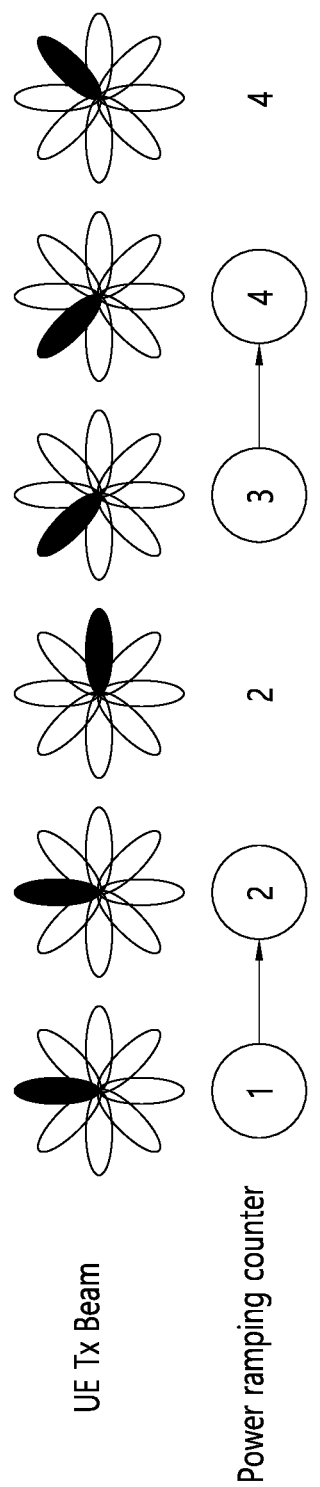
FIG. 18 illustrates a power ramping counter.

FIG. 18 illustrates a power ramping counter.

The UE may perform power ramping for retransmission of a random access preamble based on the power ramping counter. As described above, the power ramping counter does not change when the UE performs beam switching at the time of PRACH retransmission.

According to FIG. 18, when the UE retransmits a random access preamble for the same beam, such as when the power ramping counter increases from 1 to 2 and 3 to 4, the UE increases the power ramping counter by 1. However, when the beam is changed, the power ramping counter may not change at the time of PRACH retransmission.

Figure 19:
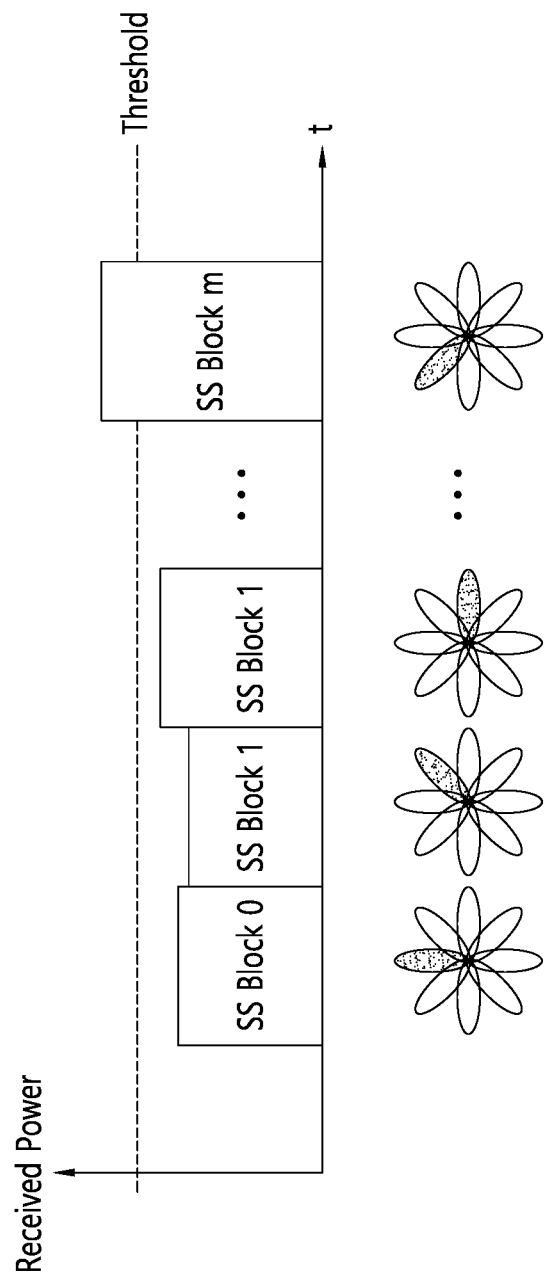
FIG. 19 illustrates a threshold of an SS block in the RACH resource relationship.

FIG. 19 illustrates a threshold of an SS block in the RACH resource relationship.

The system information may inform the UE of the relationship between SS blocks and RACH resources. The threshold of an SS block in the RACH resource relationship may be based on the RSRP and network configuration. Transmission and retransmission of the RACH preamble may be based on the SS block satisfying the threshold. Therefore, in the example of FIG. 19, since SS block m exceeds the threshold of receive power, the RACH preamble is transmitted or retransmitted based on the SS block m.

Afterwards, when the UE receives a random access response on the DL-SCH, the DL-SCH may provide timing array information, an RA-preamble ID, an initial uplink grant, and temporary C-RNTI.

Based on the information, the UE may perform uplink transmission on the UL-SCH as message 3 (Msg3) of the random access procedure. Msg3 may include an RRC connection request and a UE identity.

As a response to the uplink transmission, the network may transmit Msg4 that may be treated as a contention resolution message via downlink transmission. By receiving Msg4, the UE may enter the RRC connection state.

In what follows, the random access procedure will be described in more detail.

Before starting a physical random access procedure, layer 1 has to receive a set of SS/PBCH block indexes from the upper layer and provide a set of corresponding RSRP measurements to the upper layer.

Before starting the physical random access procedure, layer 1 has to receive the following information from the upper layer:
  Configuration of PRACH transmit parameter (PRACH preamble format, time resources, and frequency resources for PRACH transmission) and
  Parameter for determination of a root sequence and a cyclic shift (index of a logical root sequence table, cyclic shift (NCS), and set type (unrestricted set, restricted set A or restricted set B)) within the PRACH preamble sequence set for the parameter.

From the physical layer perspective, the L1 random access procedure includes transmission of random access preamble (Msg1) in a PRACH, Random Access Response (RAR) message (Msg2) with a PDCCH/PDSCH, and when applicable, Msg3 PUSCH; and transmission of PDSCH for contention resolution.

If the random access procedure is started by a PDCCH order to the UE, random access preamble transmission may have a subcarrier spacing which is the same as the subcarrier spacing of random access preamble transmission initiated by the upper layer.

When the UE is configured with two uplink subcarriers for a serving cell and the UE detects the PDCCH order, the UE may use a UL/SUL indicator field value from the detected PDCCH order to determine the uplink subcarrier for the corresponding random access preamble transmission.

In what follows, the random access preamble will be described in more detail.

In the random access preamble transmission step, the physical random access procedure may be triggered by an upper layer, a PDCCH order, or a request for PRACH transmission. Configuration of PRACH transmission by the upper layer may include the following:
  Configuration about PRACH transmission; and
  Preamble index, preamble subcarrier spacing, $P_{PRACH,target}$, corresponding RA-RNTI, and PRACH resource.

The preamble may be transmitted according to a selected PRACH format having transmission power $P_{PRACH,b,f,c(i)}$ on the indicated PRACH resource.

A plurality of SS/PBCH blocks related to one PRACH occasion may be provided to the UE by the upper layer parameter SSB-perRACH-Occasion. If SSB-perRACH-Occasion is smaller than 1, one SS/PBCH block may be mapped to contiguous PRACH occasions of 1/SSB-per-RACH-Occasion. A plurality of preambles are provided to the UE for each SS/PBCH by the upper layer parameter cb-preamblePerSSB, and the UE may determine a multiple of SSB-perRACH-Occasion and the value of cb-preamblePerSSB as the total number of preambles for each PRACH and SSB.

The SS/PBCH block index may be mapped to the PRACH occasions according to the following order:
  First, an ascending order of a preamble index within a single PRACH occasion,
  Second, an ascending order of frequency resource index with respect to frequency multiplexed PRACH occasions,
  Third, an ascending order of time resource index with respect to time multiplexed PRACH occasions within the PRACH slot, and
  Fourth, an ascending order of index with respect to PRACH slots.

The period that starts from frame 0, at which SS/PBCH blocks are mapped to PRACH occasions, is the minimum value of the PRACH configuration periods {1, 2, 4}, which is larger than or equal to $[N_{Tx}^{SSB}/N_{PRACHperiod}^{SSB}]$; here, the UE obtains $N_{Tx}^{SSB}$ by the upper layer parameter SSB-transmitted-SIB1, and $N_{PRACHperiod}^{SSB}$ represents the number of SS/PBCH blocks that may be mapped to one PRACH configuration period.

If the random access procedure is started by the PDCCH order and is requested by the upper layer, the UE has to transmit the PRACH within the first available PRACH occasion, where the time difference between the last symbol at which the PDCCH order is received and the first symbol of PRACH transmission is larger than or equal to $N_{T,2}+\Delta_{BWPSwitching}+\Delta_{Delay}$ msec. Here, $N_{T,2}$ represents duration of $N_2$ symbols corresponding to PUSCH preparation time with respect to PUSCH processing capability 1, $\Delta_{BWPSwitching}$ is a predefined value, and $\Delta_{Delay}>0$.

In what follows, the random access response will be described in more detail.

In response to the PRACH transmission, the UE may attempt to detect a PDCCH having the corresponding RA-RNTI during a window controlled by the upper layer. The window may start from the first symbol of the earliest control resource set configured for the UE with respect to the Type 1-PDCCH common search space comprising at least $[(\Delta \cdot N_{slot}^{subframe,\mu} \cdot N_{symb}^{slot})/T_{sf}]$ symbols after the last symbol of preamble sequence transmission. The length of the window as expressed in terms of the number of slots may be provided by the upper layer parameter rar-WindowLength based on the subcarrier spacing with respect to the Type0-PDCCH common search space.

If the UE detects a PDCCH having the corresponding RA-RNTI and the corresponding PDSCH including a DL-SCH transmission block within the window, the UE may transmit the transmission block to the upper layer. The upper layer may parse the transmission block with respect to the Random Access Preamble Identity (RAPID) related to the PRACH transmission. If the upper layer identifies RAPID within an RAR message(s) of the DL-SCH transmission block, the upper layer may indicate an uplink grant to the physical layer. This may be referred to as a Random Access Response (RAR) uplink grant in the physical layer. If the upper layer fails to identify the RAPID related to the PRACH transmission, the upper layer may instruct the physical layer to transmit the PRACH. The minimum time difference between the last symbol at which the PDSCH is received and the first symbol of the PRACH transmission is the same as $N_{T,1}+\Delta_{new}+0.5$, where $N_{T,1}$ represents the duration of $N_{T,1}$ symbols corresponding to the PDSCH reception time with respect to the PDSCH processing capability 1 when an additional PDSCH DM-RS is configured, and $\Delta_{new} \geq 0$.

For a detected SS/PBCH block or a received CSI-RS, the UE may have to receive the corresponding PDSCH including a PDCCH having the corresponding RA-RNTI and a DL-SCH transmission block having the same DM-RS antenna port Quasi Co-Location (QCL) characteristics. If the UE attempts to detect a PDCCH having the corresponding RA-RNTI as a response to PRACH transmission initiated by the PDCCH order, the UE may assume that the PDCCH and PDCCH order have the same DM-RS antenna port QCL characteristics.

The RAR uplink grant schedules PUSCH transmission of the UE (Msg3 PUSCH). Configuration of the RAR uplink grant, which starts from the MSG and ends at the LSB, may be given as shown in Table 6. Table 6 shows the size of a random access response grant configuration field.

TABLE 6

| RAR grant field | Number of bits |
| --- | --- |
| Frequency hopping flag | 1 |
| Msg3 PUSCH frequency resource allocation | 14 |
| Msg3 PUSCH time resource allocation | 4 |
| MCS | 4 |
| TPC command for Msg3 PUSCH | 3 |
| CSI request | 1 |
| Reserved bits | 3 |

Msg3 PUSCH frequency resource allocation is related to uplink resource allocation type 1. In the case of frequency hopping, based on the indication of the frequency hopping flag field, the first or first two bits $N_{UL,hop}$ of the Msg3 PUSCH frequency resource allocation field may be used as hopping information bits.

MCS may be determined by the first 16 indexes of the MCS index table applicable to the PUSCH.

The TPC command $\delta_{msg2,b,f,c}$ may be used for power configuration of the Msg3 PUSCH and may be interpreted according to Table 7 below.

TABLE 7

| TPC Command | Value [dB] |
| --- | --- |
| 0 | −6 |
| 1 | −4 |
| 2 | −2 |
| 3 | 0 |
| 4 | 2 |
| 5 | 4 |
| 6 | 6 |
| 7 | 8 |

In a non-contention based random access procedure, the CSI request field is interpreted to determine whether a non-periodic CSI report is included in the corresponding PUSCH transmission. In the contention-based random access procedure, the CSI request field may be reserved.

As long as the UE does not configure the subcarrier spacing, the UE receives a subsequent PDSCH by using the subcarrier spacing that is the same as PDSCH reception that provides an RAR message.

If the UE does not detect a PDCCH having the corresponding RA-RNTI within a window and the corresponding DL-SCH transmission block, the UE performs a random access response reception failure procedure.

In what follows, the Msg3 PUSCH transmission will be described in more detail.

With respect to Msg3 PUSCH transmission, the upper layer parameter msg3-tp indicates whether the UE has to apply a transform precoding for the Msg3 PUSCH transmission. If the UE applies a transform precoding for Msg3 PUSCH transmission employing frequency hopping, the frequency offset for the second hop may be given as shown in Table 8. Table 8 illustrates a frequency offset of the second hop with respect to the Msg3 PUSCH transmission employing frequency hopping.

TABLE 8

| Number of PRBs in initial active UL BWP | Value of $N_{UL,\,hop}$ Hopping Bits | Frequency offset for 2nd hop |
| --- | --- | --- |
| $N_{BWP}^{size} < 50$ | 0 | $N_{BWP}^{size}/2$ |
|  | 1 | $N_{BWP}^{size}/4$ |
| $N_{BWP}^{size} \geq 50$ | 00 | $N_{BWP}^{size}/2$ |
|  | 01 | $N_{BWP}^{size}/4$ |
|  | 10 | $-N_{BWP}^{size}/4$ |
|  | 11 | Reserved |

The subcarrier spacing for Msg3 PUSCH transmission may be provided by the upper layer parameter msg3-scs. The UE has to transmit the PRACH and Msg3 PUSCH on the same uplink carrier of the same serving cell. The uplink BWP for the Msg3 PUSCH transmission may be indicated by SystemInformationBlockType1.

When the PDSCH and PUSCH have the same subcarrier spacing, the minimum time difference between the last symbol at which the PDSCH carrying the RAR is received and the first symbol of the corresponding Msg3 PUSCH transmission scheduled by the RAR within the PDSCH with respect to the UE may be the same as $N_{T,1}+N_{T,2}+N_{TA,max}+0.5$ msec. Here, $N_{T,1}$ represents the duration of $N_1$ symbols corresponding to the PDSCH reception with respect to the PDSCH processing capability 1 when an additional PDSCH DM-RS is configured, $N_{T,2}$ represents the duration of $N_2$ symbols corresponding to the PUSCH preparation time with respect to the PUSCH processing capability 1, and $N_{TA,max}$ represents the maximum timing adjustment value that may be provided by the TA command field within the RAR.

In what follows, contention resolution will be described in more detail.

If the UE fails to receive C-RNTI, the UE attempts to detect a PDCCH having the corresponding TC-RNTI that schedules a PDSCH including UE contention resolution identity in response to the Msg3 PUSCH transmission. In response to the reception of the PDSCH having the UE contention resolution identity, the UE transmits HARQ-ACK information within the PUCCH. The minimum time difference between the last symbol at which the PDSCH is received and the first symbol of the corresponding HARQ-ACK transmission is $N_{T,1}+0.5$ msec. $N_{T,1}$ represents the duration of $N_1$ symbols corresponding to the PDSCH reception with respect to the PDSCH processing capability 1 when an additional PDSCH DM-RS is configured.

In what follows, a channel coding scheme will be described.

A channel coding scheme according to one embodiment of the present disclosure may include a Low Density Parity Check (LDPC) coding scheme mostly for data and a polar coding scheme for control information.

The network/UE may perform the LDPC coding for a PDSCH/PUSCH having a support for two base graphs (BGs). Here, BG1 may be related to mother code rate ⅓, and BG2 may be related to mother code rate ⅕.

For coding of control information, various coding schemes such as repetition coding, simplex coding, and Reed-Muller coding may be supported. The polar coding scheme may be applied to the case where the control information has a length longer than 11 bits. For downlink transmission, the mother code size may be 512, and the mother code size for uplink transmission may be 1024. The coding schemes for uplink control information may be summarized as shown in the table below.

TABLE 9

| Uplink Control Information size including CRC, if present | Channel code |
| --- | --- |
| 1 | Repetition code |
| 2 | Simplex code |
| 3-11 | Reed Muller code |
| >11 | Polar code |

The polar coding scheme may be used for a PBCH. This coding scheme may be the same as used for the case of a PDCCH.

In what follows, LDPC coding structure will be described.

An LDPC code is a (n, k) linear block code defined by the null-space of a (n−k)×n sparse parity check matrix H.

The LDPC code that may be applied to one embodiment of the present disclosure may be expressed as follows.

$$Hx^T = 0 \quad [Eq. 4]$$

$$Hx^T = \begin{bmatrix} 1 & 1 & 1 & 0 & 0 \\ 1 & 0 & 0 & 1 & 1 \\ 1 & 1 & 0 & 0 & 0 \\ 0 & 1 & 1 & 1 & 0 \end{bmatrix} \begin{bmatrix} x1 \\ x2 \\ x3 \\ x4 \\ x5 \end{bmatrix} = 0$$

Figure 20:
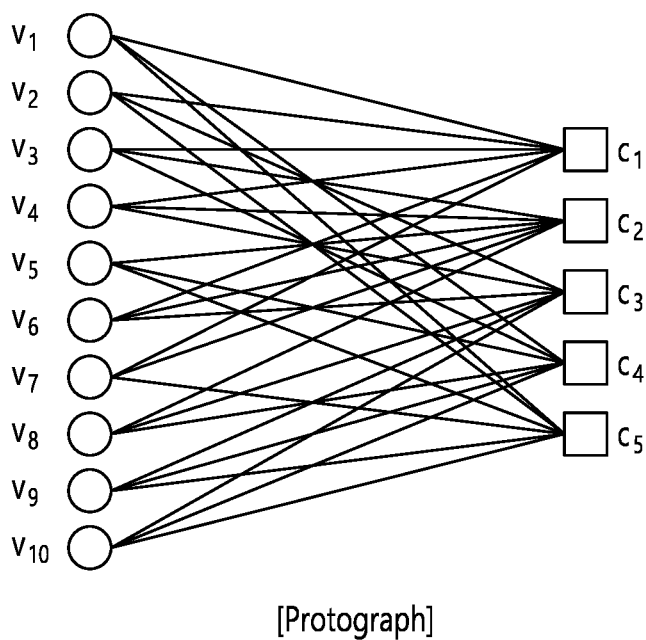
FIG. 20 illustrates a parity check matrix expressed by a protograph.

FIG. 20 illustrates a parity check matrix expressed by a protograph.

More specifically, FIG. 20 shows a parity check matrix about the association relationship between variable nodes and check nodes, which is expressed by a protograph.

As one example, according to FIG. 20, variable nodes having an association relationship with the check node $c_1$ are $v_1, v_2, v_3, v_4, v_6, v_7$, and check nodes having an association relationship with the variable node $v_8$ are $c_2, c_3, c_4$.

Figure 21:
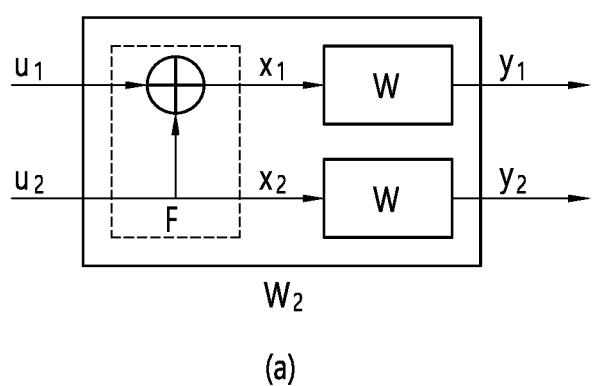
FIG. 21 illustrates one example of an encoder structure for the polar code.

FIG. 21 illustrates one example of an encoder structure for the polar code. More specifically, FIG. 21(a) shows one example of a base module of the polar code, and FIG. 21(b) shows a base matrix.

The polar code is known as the code capable of obtaining channel capacity in the Binary-input Discrete Memoryless Channel (B-DMC). In other words, if the size N of a code block increases indefinitely, channel capacity may be obtained.

Figure 22:
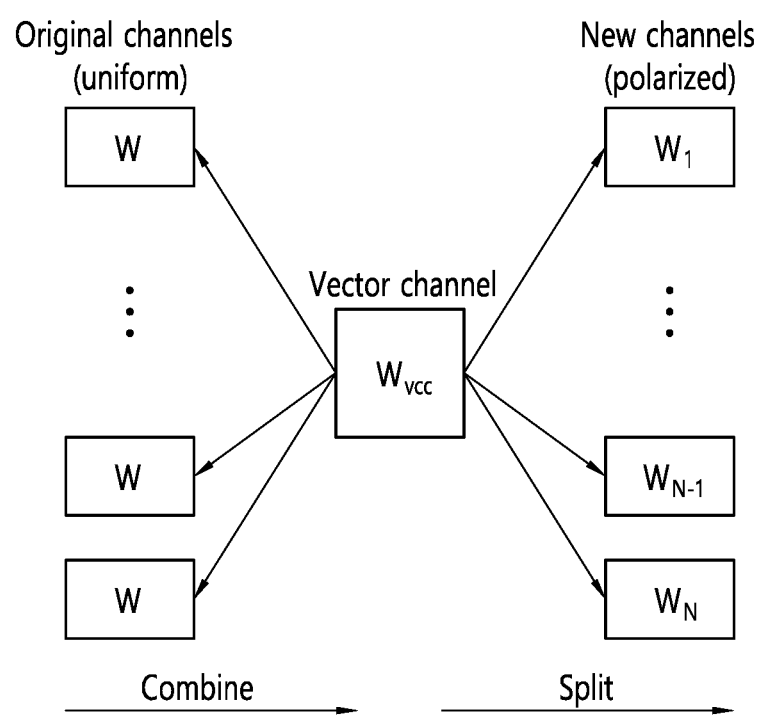
FIG. 22 illustrates one example of an encoder operation based on the polar code.

FIG. 22 illustrates one example of an encoder operation based on the polar code.

Referring to FIG. 22, the encoder based on the polar code may perform channel combining and channel division. More specifically, the encoder based on the polar code may combine existing channels into one vector channel or divide one vector channel into a plurality of new channels. As one example, the existing channels before being combined into one vector channel may be uniform, and a plurality of new channels split from one vector channel may be polarized.

In what follows, Discontinuous Reception (DRX) will be described.

Discontinuous Reception (DRX) refers to an operation mode in which a UE reduces battery consumption to receive a downlink channel in a discontinuous manner. In other words, a UE configured for DRX may reduce power consumption by receiving a DL signal discontinuously.

A DRX operation is performed within a DRX cycle representing a time interval in which On Duration is repeated periodically. A DRX cycle includes On Duration and Sleep Duration (or an occasion of DRX). On Duration refers to a time interval in which a UE monitors a PDCCH to receive the PDCCH.

DRX may be performed in the Radio Resource Control (RRC)_IDLE state (or mode), RRC_INACTIVE state (or mode) or RRC_CONNECTED state (or mode). In the RRC_IDLE state and RRC_INACTIVE state, DRX may be used to receive a paging signal discontinuously.

- RRC_IDLE state: The state in which a radio connection (RRC connection) is not established between a base station and a UE.
- RRC_INACTIVE state: The state in which, although a radio connection (RRC connection) has been established between the base station and the UE, the radio connection is deactivated.
- RRC_CONNECTED state: The state in which a radio connection (RRC connection) is established between the base station and the UE.

DRX may be basically divided into idle mode DRX, Connected DRX (C-DRX), and extended DRX.

DRX applied in the IDLE state may be referred to as idle mode DRX, and DRX applied in the CONNECTED state may be referred to as Connected mode DRX (C-DRX).

Extended/Enhanced DRX (eDRX) is a mechanism that may extend the cycle of the idle mode DRX and C-DRX and may be mostly used for (passive) IoT applications. In the idle mode DRX, whether to allow eDRX may be configured based on system information (for example, SIB1). SIB1 may include an eDRX-allowed parameter. The eDRX-allowed parameter represents whether extended DRX is allowed in the idle mode.

In what follows, idle mode DRX is described.

In the idle mode, the UE may use DRX to reduce power consumption. One paging occasion (PO) is a subframe in which Paging-Radio Network Temporary Identifier (P-RNTI) may be transmitted on a Physical Downlink Control Channel (PDCCH) or an MTC PDCCH (MPDCCH) or a Narrowband PDCCH (NPDCCH) (addressing a paging message for NB-IoT).

In the P-RNTI transmitted on the MPDCCH, PO may represent a starting subframe of MPDCCH repetitions. In the case of P-RNTI transmitted on the NPDCCH, when a subframe determined by PO is not a valid NB-IoT downlink subframe, PO may represent a starting subframe of NPDCCH repetitions. Therefore, the first valid NB-IoT downlink subframe after PO is the starting subframe of NPDCCH repetitions.

One Paging Frame (PF) is one radio frame, which may contain one or a plurality of POs. When DRX is used, the UE only needs to monitor one PO per DRX cycle. One Paging Narrowband (PNB) is one narrowband, on which the UE performs reception of a paging message. PF, PO, and PNB are determined based on the DRX parameters provided in System Information.

Figure 23:
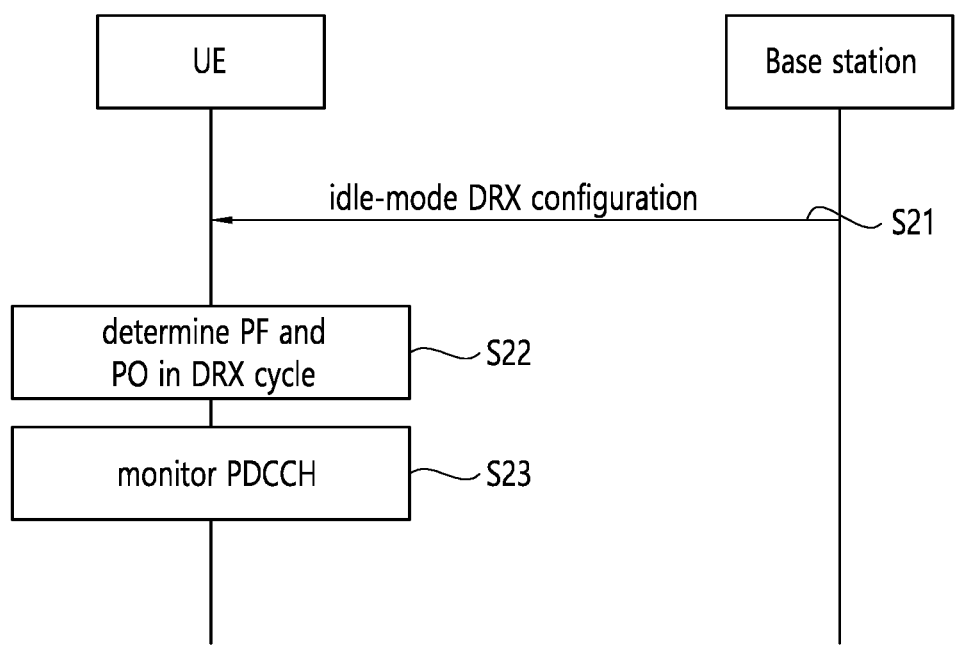
FIG. 23 is a flow diagram illustrating one example in which an idle mode DRX operation is performed.

FIG. 23 is a flow diagram illustrating one example in which an idle mode DRX operation is performed.

According to FIG. 23, the UE may receive idle mode DRX configuration information from a base station through upper layer signaling (for example, system information) S21.

The UE may determine the Paging Frame (PF) and Paging Occasion (PO) to monitor a PDCCH in a paging DRX cycle based on the idle mode DRX configuration information S22. In this case, the DRX cycle may include On Duration and Sleep Duration (or an occasion of DRX).

The UE may monitor the PDCCH at the PO of a determined PF S23. In this case, for example, the UE monitors only one subframe (PO) per paging DRX cycle. Also, if the UE receives a PDCCH scrambled by P-RNTI during the On Duration (namely, when paging is detected), the UE may transition to the connected mode and transmit and receive data to and from the base station.

Figure 24:
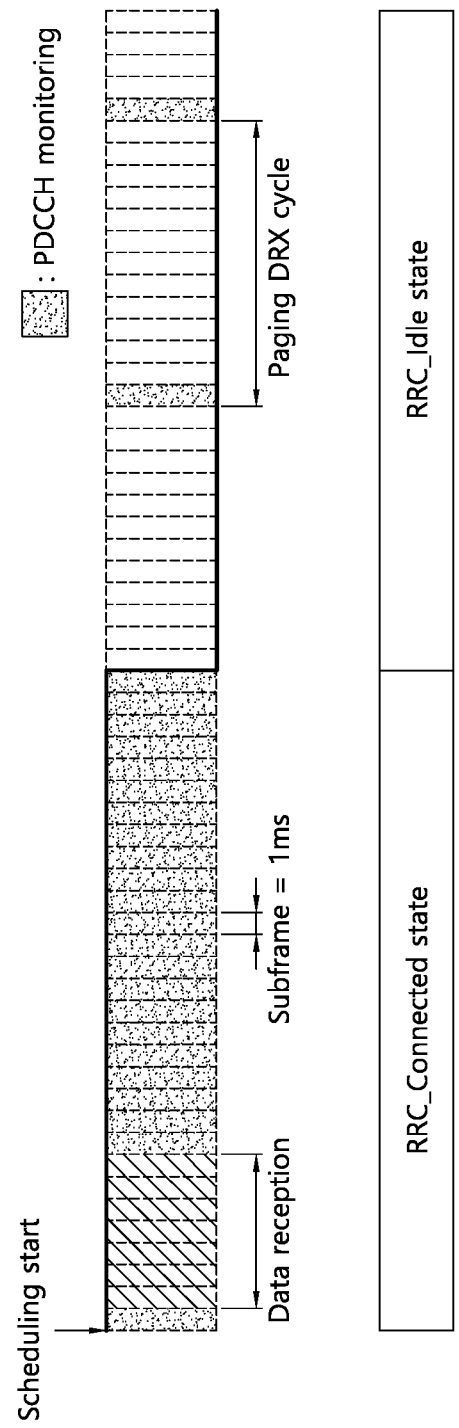
FIG. 24 illustrates one example of an idle mode DRX operation.

FIG. 24 illustrates one example of an idle mode DRX operation.

According to FIG. 24, when there exists traffic directed toward the UE in the RRC_IDLE state (hereinafter, referred to as 'idle state'), paging is generated with respect to the corresponding UE. The UE may wake up periodically (namely, every (paging) DRX periods) to monitor a PDCCH. In the absence of paging, the UE may transition to the connected state, receive data, and enter the sleep mode again if there exists no data.

In what follows, Connected mode DRX (C-DRX) is described.

C-DRX refers to DRX applied in the RRC connected state. The DRX cycle for C-DRX may be composed of a short DRX cycle and/or a long DRX cycle. Here, a short DRX cycle may be selected optionally.

When C-DRX is configured, the UE may perform PDCCH monitoring with respect to On Duration. If a PDCCH is successfully detected during PDCCH monitoring, the UE operates (or runs) an inactive timer and maintain the timer in the awake state. On the other hand, if a PDCCH is not detected successfully during PDCCH monitoring, the UE may enter the sleep state after the On Duration expires.

When C-DRX is configured, a PDCCH reception occasion (for example, a slot having PDCCH search space) may be configured to be discontinuous based on the C-DRX configuration. On the other hand, if C-DRX is not configured, the PDCCH reception occasion (for example, a slot having PDCCH search space) may be configured to be continuous according to the present disclosure.

Meanwhile, PDCCH monitoring may be limited to a time interval configured in terms of a measurement gap regardless of the C-DRX configuration.

Figure 25:
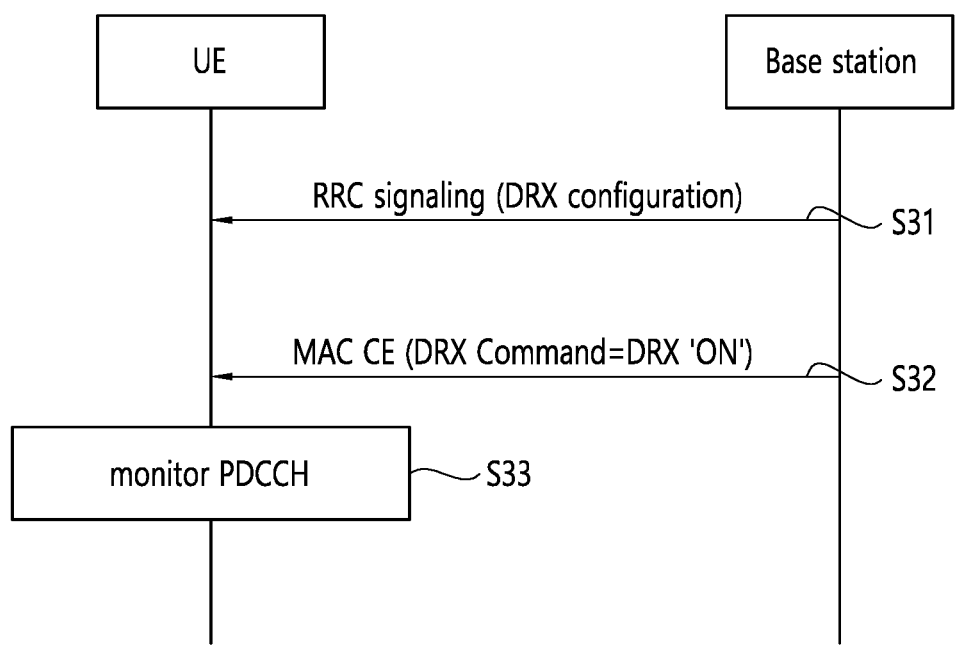
FIG. 25 is a flow diagram illustrating one example of a method for performing a C-DRX operation.

FIG. 25 is a flow diagram illustrating one example of a method for performing a C-DRX operation.

The UE may receive RRC signaling (for example, MAC-MainConfig IE) including DRX configuration information from a base station S31.

Here, DRX configuration information may include the following information.

onDurationTimer: The number of PDCCH subframes to be monitored continuously from the starting position of a DRX cycle.

drx-InactivityTimer: The number of PDCCH subframes to be monitored continuously when the UE decodes a PDCCH having scheduling information.

drx-RetransmissionTimer: The number of PDCCH subframes to be monitored continuously when HARQ retransmission is expected.

longDRX-Cycle: The period during which On Duration is generated.

drxStartOffset: The subframe number at which a DRX cycle is started.

drxShortCycleTimer: The short DRX cycle number shortDRX-Cycle: A DRX cycle operating as many times as the number of drxShortCycleTimers when the Drx-InactivityTimer expires.

Also, when DRX 'ON' is configured by the DRX command of the MAC Command Element (CE) S32, the UE monitors the PDCCH with respect to the On Duration of the DRX cycle based on the DRX configuration S33.

Figure 26:
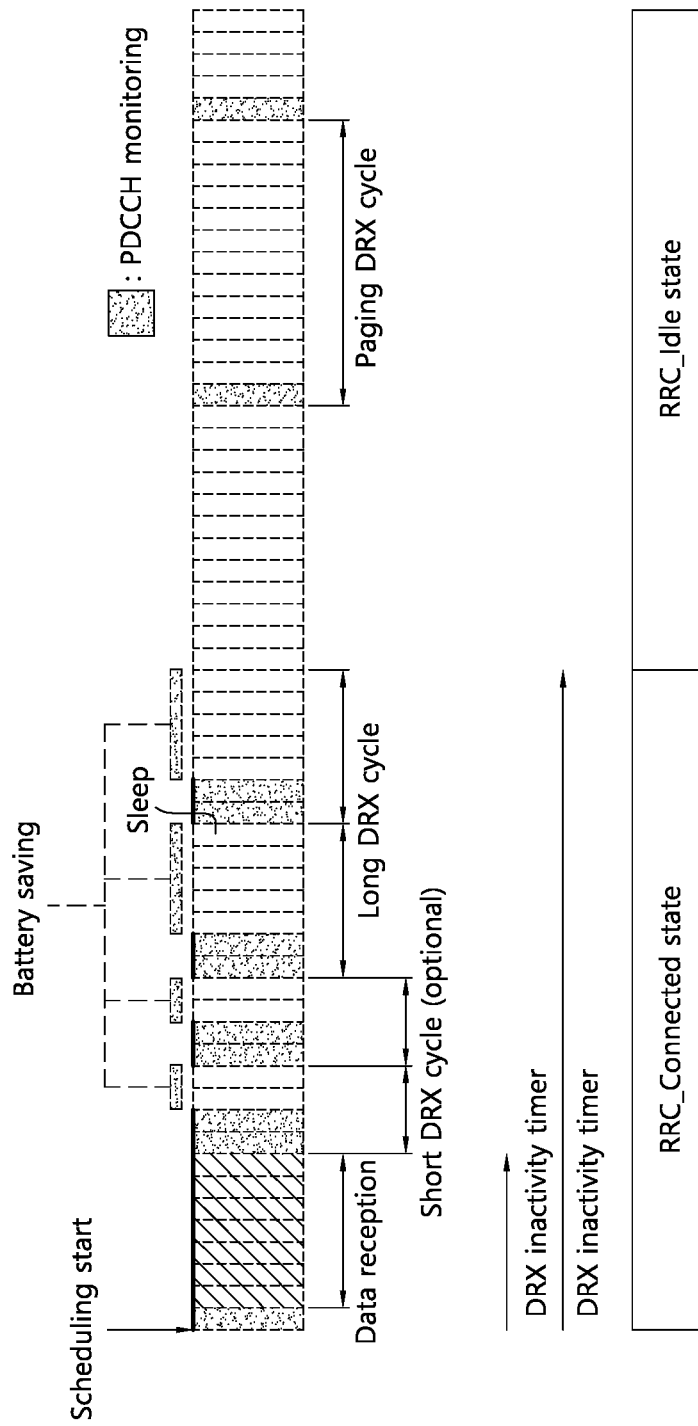
FIG. 26 illustrates an example of a C-DRX operation.

FIG. 26 illustrates an example of a C-DRX operation.

If the UE receives scheduling information (for example, a DL grant) in the RRC_CONNECTED state (in what follows, referred to as connected state), the UE may execute the DRX inactive timer and the RRC inactive timer.

When the DRX inactive timer expires, the DRX mode may be started. The UE may wake up from the DRX cycle and monitor the PDCCH for a predetermined time period (on the duration timer).

In this case, when short DRX is configured and the UE starts the DRX mode, the UE first starts with a short DRX cycle and after the short DRX cycle is completed, starts a long DRX cycle. Here, the long DRX cycle may correspond to a multiple of the short DRX cycle. Moreover, during the short DRX cycle, the UE may wake up more often. After the RRC inactive timer expires, the UE may transition to the IDLE state and perform the IDLE mode DRX operation.

In what follows, a combination of IA/RA and a DRX operation (IA/RA+DRX operation) is described.

Figure 27:
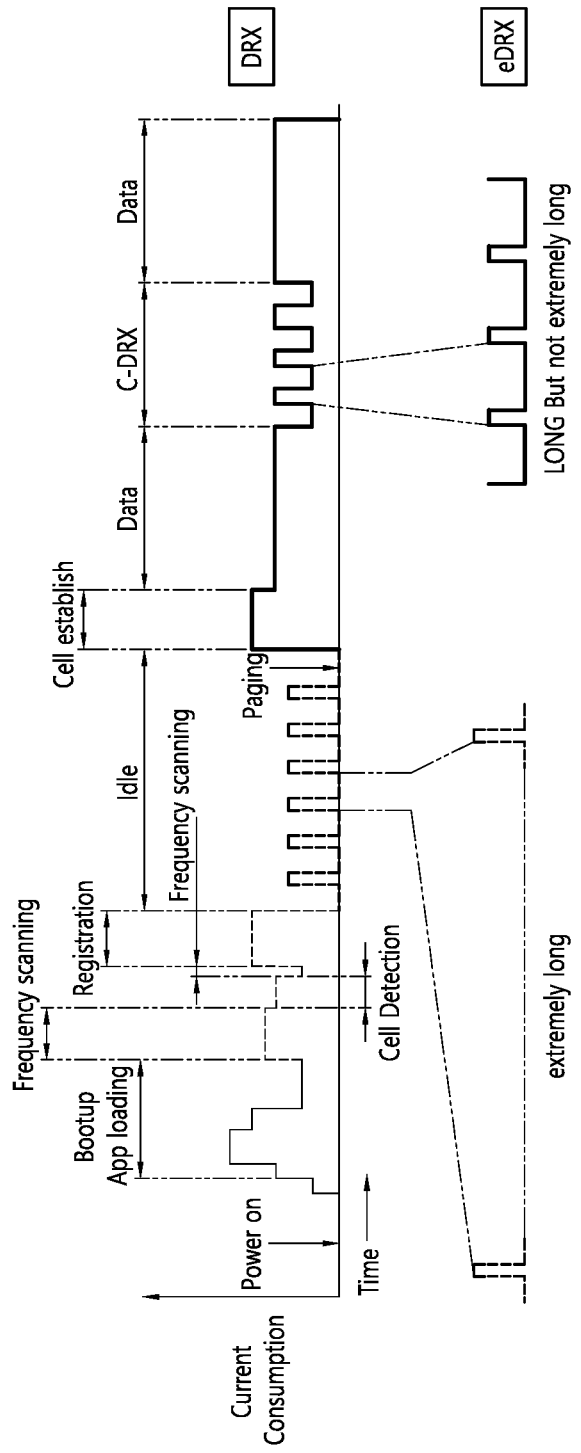
FIG. 27 illustrates an example of power consumption according to the state of a UE.

FIG. 27 illustrates an example of power consumption according to the state of a UE.

According to FIG. 27, after the UE is powered up, the UE performs boot-up for application loading, an initial access/random access procedure for downlink and uplink synchronization with a base station, and a registration procedure for a network. FIG. 27 shows an amount of current (or an amount of power) consumed while each procedure is carried out.

If transmission power of the UE is high, current consumption of the UE may be increased. Also, when the UE does not have traffic to be transmitted thereto or to a base station, the UE transitions to the idle mode to reduce power consumption and performs the idle mode DRX operation.

Meanwhile, if paging (for example, a call) occurs during the idle mode DRX operation, the UE may transition to the connected mode from the idle mode through a cell establishment procedure and transmit and receive data to and from the base station.

Also, when there is no data received from or transmitted to the base station in the connected mode or for a specific time period of a configured timing, the UE may perform the connected mode DRX (C-DRX).

Also, when the UE is configured with extended DRX (eDRX) through upper layer signaling (for example, system information), the UE may perform an eDRX operation in the idle mode or connected mode.

In what follows, the present disclosure will be described in more detail.

The methods proposed below may be applied to a UE connected to a network through an initial access process. However, the methods are not limited to the aforementioned UE.

The UE transitions from the DRX state to the active state by an activation timer such as drx-onDurationTimer, drx-InactivityTimer, drx-RetransmissionTimerDL, drx-RetransmissionTimerUL, and ra-ContentionResolutionTimer. The activation timer wakes up the UE at a scheduled time regardless of whether the UE should be actually awake. Suppose the UE is aware of the activation timer; however, if the UE additionally informs the corresponding timer of whether or not the UE should actually be activated, power consumption of the UE may be minimized. A signal indicating whether to activate the UE may be referred to as a wake-up signal.

A detailed embodiment of a wake-up signal is as follows.

When a UE is in a connected mode (or RRC_CONNECTED mode) and DRX (or C-DRX) state, the UE may have information on timers that have to be woken up from the DRX state. According to a conventional operation, when the activation timer is triggered, the UE transitions from the DRX state to the active state to receive control information and data, and when the activation timer expires, returns to the DRX state.

At this time, if the UE is informed by the base station that a wake-up signal linked to an activation timer may be transmitted before the activation timer and receives the corresponding wake-up signal, the corresponding activation timer may be triggered to its original state. If the wake-up signal is not received, it is understood that the base station has informed of the absence of control information or data within the corresponding activation timer and the UE does not wake up at the corresponding activation timer.

The wake-up signal performing the function above may be implemented by a plurality of methods with various features. What is important is that there exists a signal from a base station that makes a UE wake up.

The present disclosure proposes features that may be used for signaling of a wake-up signal. In defining a wake-up signal, the structure of a reference signal defined in the existing methods may be utilized; however, since a UE already knows how to generate a reference signal and a separate sequence may be generated using only simple modifications between a base station and the UE, a burden of generating a new signal may be minimized not only on the UE side but also on the base station side.

Figure 28:
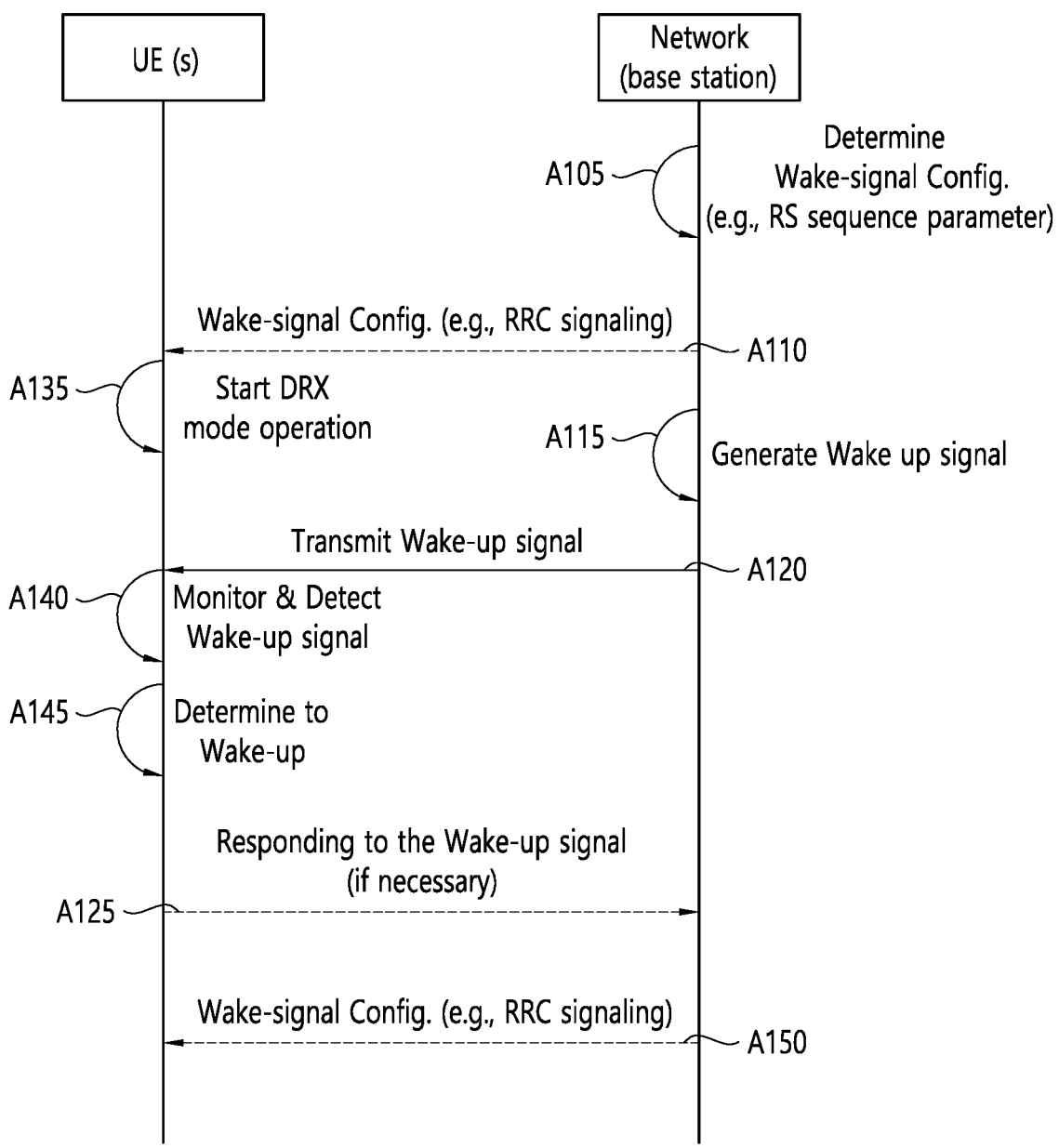
FIG. 28 illustrates a procedure for transmitting and receiving a wake-up signal according to partial implementation of the present disclosure.

FIG. 28 illustrates a procedure for transmitting and receiving a wake-up signal according to partial implementation of the present disclosure.

FIG. 28 illustrates one embodiment of the present disclosure, which may be applied to a procedure for transmitting and receiving a wake-up signal to be described later and/or a procedure for transmitting and receiving a go-to-sleep signal, but the present disclosure is not limited to the embodiment of FIG. 28.

Referring to FIG. 28, a network (for example, at least one or more base stations) determines configuration information on a wake-up signal (for example, reference signal sequence parameters for a wake-up signal) A105.

The network transmits the determined configuration information on a wake-up signal to at least one UE A110. For example, higher layer signaling (for example, RRC), MAC CE and/or PHY signaling (for example, DCI through a PDCCH) may be used for this purpose. Or, a plurality of wake-up signal parameter sets may be provided through RRC signaling, after which a wake-up signal parameter set may be indicated dynamically through a field of the MAC CE or the DCI.

Meanwhile, if configuration information on a wake-up signal is predefined or fixed, the operation of A105 and/or A110 may be omitted.

Afterward, the network generates a wake-up signal A115 and transmits the generated signal to at least one UE A120.

The network transmits a signal (for example, a go-to-sleep signal) that instructs a UE in the awake state to operate in the DRX mode A150.

The UE may receive the configuration information on a wake-up signal A110.

The UE may start DRX mode operations A135.

The UE monitors and detects a wake-up signal in the DRX mode A140.

The UE may determine whether to wake up based on the detected wake-up signal. For example, if the detected wake-up signal is intended for the UE, the UE determines to wake up A145.

The operation steps of FIG. 28 may also be applied to the embodiments to be described later, but the embodiments to be described later should not be interpreted to be limited to the operation steps of FIG. 28. Also, all of the respective steps of FIG. 28 are not essential, and some may be omitted.

Meanwhile, in what follows, the DMRS of the PBCH as a triggering signal will be described.

As a wake-up signal that may be transmitted by a base station to a UE, the DMRS of the PBCH may be considered. In one example, a reference signal sequence r(n) of the PBCH may be composed as follows.

$$r(n) = \frac{1}{\sqrt{2}}(1 - 2 \cdot c(2n)) + j\frac{1}{\sqrt{2}}(1 - 2 \cdot c(2n+1)) \qquad [\text{Eq. 5}]$$

$$c(n) = (x_1(n + N_C) + x_2(n + N_C)) \bmod 2$$

$$x_1(n + 31) = (x_1(n + 3) + x_1(n)) \bmod 2$$

$$x_2(n + 31) = (x_2(n + 3) + x_2(n + 2) + x_2(n + 1) + x_2(n)) \bmod 2$$

$$c_{init} = \sum_{i=0}^{30} x_2(i) \cdot 2^i$$

$$c_{init} = 2^{11}(\bar{i}_{SSB} + 1)(\lfloor N_{ID}^{cell}/4 \rfloor + 1) + 2^{6}(\bar{i}_{SSB} + 1) + (N_{ID}^{cell} \bmod 4)$$

At this time, the DMRS sequence may be determined from $\bar{i}_{SSB}$ and $N_{ID}^{cell}$. Here, in one example, the $\bar{i}_{SSB}$ value may be determined based on the index of SSB and a half frame number.

Suppose that the DMRS sequence may be generated by adjusting the two values. When a sequence is generated by using the $\bar{i}_{SSB}$ value or $N_{ID}^{cell}$ value agreed on between the base station and the UE to use a reference signal as a wake-up signal, the UE may know upon reception of the corresponding reference signal sequence that the base station has instructed the UE to wake up. In other words, a method for utilizing the DMRS of the PBCH as a wake-up signal may be summarized as follows.

Option 1: The base station defines a specific $\bar{\iota}_{SSB}$ value for generating a reference signal sequence to be used as a wake-up signal and instructs the UE to wake up by transmitting a reference signal using the corresponding $\bar{\iota}_{SSB}$ to the UE.

Here, the specific $\bar{\iota}_{SSB}$ value may be predefined or transmitted to the UE after being defined through RRC/higher layer signaling.

Option 2: The base station defines a specific $N_{ID}^{cell}$ value for generating a reference signal sequence to be used as a wake-up signal and instructs the UE to wake up by transmitting a reference signal using the corresponding $N_{ID}^{cell}$ to the UE.

Here, the specific $N_{ID}^{cell}$ value may be predefined or transmitted to the UE after being defined through RRC/higher layer signaling.

Option 3: The base station defines specific $\bar{\iota}_{SSB}$ and $N_{ID}^{cell}$ values for generating a reference signal sequence to be used as a wake-up signal and instructs the UE to wake up by transmitting a reference signal using both of the corresponding $\bar{\iota}_{SSB}$ and $N_{ID}^{cell}$ to the UE.

Here, the specific $\bar{\iota}_{SSB}$ and $N_{ID}^{cell}$ values may be predefined or transmitted to the UE after being defined through RRC/higher layer signaling.

Option 4: The $N_{ID}^{cell}$ value may be configured for each UE or cell. The UE may obtain the $\bar{\iota}_{SSB}$ value from blind decoding of various values, and depending on the result of the corresponding blind decoding, a different interpretation may be obtained. As one example, $\bar{\iota}_{SSB}$ may have 16 different values, but to improve reliability of a wake-up signal, the $\bar{\iota}_{SSB}$ value may be limited to have a fewer number of values than 16 (for example, 4). Each detected $\bar{\iota}_{SSB}$ value may indicate a different UE operation.

Here, as one example, the $\bar{\iota}_{SSB}$ value may be used to represent a UE identifier (ID) or a UE group ID. As one example, the $\bar{\iota}_{SSB}$ value may be regarded as a wake-up signal of a UE corresponding to RNTI % K (where K is a value that may be taken for $\bar{\iota}_{SSB}$).

Also, the $\bar{\iota}_{SSB}$ value may be used to represent a carrier index. As one example, the $\bar{\iota}_{SSB}$ value may be used to indicate an operation for the cells corresponding to cell index % K.

Also, the $\bar{\iota}_{SSB}$ value may be used to represent a set of carrier indexes. As one example, the $\bar{\iota}_{SSB}$ value may be used to indicate an operation for the cells corresponding to an indicated index among preconfigured K carrier sets.

Also, the $\bar{\iota}_{SSB}$ value may be the power state mode index that the UE has to choose or an index of a power related configuration or an index of a bandwidth part. In other words, the $\bar{\iota}_{SSB}$ value may be used to command switching from A state/bandwidth part to B state/bandwidth part.

Meanwhile, the information may be used not only for the case where the DMRS of the PBCH is used but also for a typical case of transmitting a wake-up signal. Also, the value above due to $\bar{\iota}_{SSB}$ may be transmitted as a value of cell ID plus $\bar{\iota}_{SSB}$ or another value, where $\bar{\iota}_{SSB}$ may be only one embodiment. A wake-up signal may be transmitted to each cell or transmitted by a cross-carrier in one cell, or one wake-up signal may handle multiple carriers simultaneously.

If a wake-up signal is transmitted to each cell and a cross-carrier is configured, multiple wake-up signals may be transmitted through one carrier separately or jointly. When one wake-up signal handles multiple carriers, the corresponding information may be included in a sequence of wake-up signals or in a payload transmitted together with the wake-up signal. Overall, the options listed above may be transmitted to a sequence of wake-up signals or a payload transmitted together. When the options are transmitted to a payload, they may be transmitted according to the rule for UCI mapping.

Meanwhile, a wake-up signal may have attributes different from those of the PBCH DMRS. First, since a wake-up signal has to be applied differently for a current situation of each UE, the wake-up signal has UE-specific attributes. Although the PBCH DMRS is scrambled within SSB transmission bandwidth, since a wake-up signal is transmitted after being connected, it is desirable to be scrambled according to common PRB grids. Therefore, the following methods are proposed.

Method 1: When a PBCH DMRS sequence intended for a wake-up signal is generated, time/frequency for transmission of a wake-up signal is configured differently for each UE. In a typical example, a time period is configured using OnDuration for each UE, a frequency band is configured separately, or a bandwidth part used at the time of DRX for transmitting a wake-up signal is configured differently.

Method 2: A sequence intended for a wake-up signal is generated based on a common PRB grid.

Method 3: Each UE is identified using RNTI of a payload transmitted together with a wake-up signal.

Method 4: A UE is identified using repetition of a wake-up signal and/or a hopping pattern of the wake-up signal.

Here, the descriptions above may be applied to other methods using a CSI-RS, a PDSCH, and so on.

Meanwhile, the following may be considered when the PBCH DMRS is reused as a wake-up signal so that no ambiguity is caused by the PBCH DMRS from the point of view of a UE.

DMRS mapping may be set differently. As one example, it may be assumed that X resource blocks (RBs) and P OFDM symbols are defined as resources for a wake-up signal and a DMRS intended to be used as a wake-up signal is transmitted to all of resource elements (REs) within the corresponding resources (in a contiguous or non-contiguous manner).

A wake-up signal may be disposed so that the PBCH DMRS is orthogonal to the resources. A UE may assume that PBCH DMRS positions of a neighbor cell and a serving cell do not overlap the wake-up signal, which reduces ambiguity of the UE.

By changing the cell ID value or a function of sequence initialization, the initial value may be made to be different.

In what follows, application of the PBCH DMRS as a triggering signal will be described.

In the above, a method for generating a reference signal sequence for a wake-up signal by a base station using specific $\bar{\iota}_{SSB}$ and $N_{ID}^{cell}$ values has been proposed.

The wake-up signal may be transmitted such that one wake-up signal is defined to one UE; however, a plurality of wake-up signals may be defined for one UE, or the same wake-up signal may be defined for a particular UE group. When a plurality of wake-up signals are defined for one UE, the base station may instruct the UE to wake up under various conditions; and when the same wake-up signal is defined for a plurality of UEs, a single wake-up signal may be used to wake up a plurality of UEs simultaneously.

When a plurality of wake-up signals are defined for one UE, the UE may be in the Carrier Aggregation (CA) condition. For example, when the UE is using two carriers and a wake-up signal is defined for each carrier, the base station may indicate wake-up to the UE for each carrier. Or, when a plurality of carriers are used, a carrier set may be constructed, and wake-up may be instructed for each carrier set. For example, when the UE is using four carriers, two carrier sets may be constructed, each of which is composed of two carriers; a wake-up signal may be defined for each carrier set; and the base station may indicate wake-up for each carrier set to the UE. Meanwhile, the terms "cell" and "carrier" may be used interchangeably throughout the present disclosure, including the examples described above.

For the method above, the following options may be considered.

Option 1: The base station defines a specific $\bar{t}_{SSB}$ value for generating a reference signal sequence to be used as a wake-up signal for each carrier/carrier set linked to a UE and transmits a reference signal using the corresponding $\bar{t}_{SSB}$ to the UE to indicate wake-up for each carrier/carrier set.

Here, the specific $\bar{t}_{SSB}$ value may be predefined or transmitted to the UE after being defined through RRC/higher layer signaling.

Option 2: The base station defines a specific $N_{ID}^{cell}$ value for generating a reference signal sequence to be used as a wake-up signal for each carrier/carrier set linked to a UE and transmits a reference signal using the corresponding $N_{ID}^{cell}$ to the UE to indicate wake-up for each carrier/carrier set.

Here, the specific $N_{ID}^{cell}$ value may be predefined or transmitted to the UE after being defined through RRC/higher layer signaling.

Option 3: The base station defines specific $\bar{t}_{SSB}$ and $N_{ID}^{cell}$ values for generating a reference signal sequence to be used as a wake-up signal for each carrier/carrier set linked to a UE and transmits a reference signal using both of the corresponding $\bar{t}_{SSB}$ and $N_{ID}^{cell}$ to the UE to indicate wake-up.

Here, the specific $\bar{t}_{SSB}$ and $N_{ID}^{cell}$ values may be predefined or transmitted to the UE after being defined through RRC/higher layer signaling.

Meanwhile, a wake-up signal generated from the option 1, 2, or 3 may also be used for cross-carrier wake up. In other words, when carrier 1/carrier set 1 and carrier2/carrier set 2 are configured for the UE, the base station may transmit a wake-up signal for the carrier 2/carrier set 2 from the carrier 1/carrier set 1 or transmit a wake-up signal for the carrier 1/carrier set 1 from the carrier 2/carrier set 2.

Meanwhile, when the base station informs the UE of a carrier set defined by the option 1, 2, or 3, the base station may go through a process for grouping carrier sets in advance. The grouping criteria may consider, for example, carriers having a similar data load, carriers having a similar reception performance, and carriers showing a similar degree of power consumption.

Meanwhile, the following options may be considered for a method defining one wake-up signal for one UE group.

Option 1: The base station defines a specific $\bar{t}_{SSB}$ value for generating a reference signal sequence to be used as a wake-up signal and transmits a reference signal using the corresponding $\bar{t}_{SSB}$ to a plurality of UEs to indicate wake-up.

Here, the specific $\bar{t}_{SSB}$ value may be predefined or transmitted to the UE after being defined through RRC/higher layer signaling.

Option 2: The base station defines a specific $N_{ID}^{cell}$ value for generating a reference signal sequence to be used as a wake-up signal and transmits a reference signal using the corresponding $N_{ID}^{cell}$ to a plurality of UEs to indicate wake-up.

Here, the specific $N_{ID}^{cell}$ value may be predefined or transmitted to the UE after being defined through RRC/ higher layer signaling.

Option 3: The base station defines specific $\bar{t}_{SSB}$ and $N_{ID}^{cell}$ values for generating a reference signal sequence to be used as a wake-up signal and transmits a reference signal using both of the corresponding $\bar{t}_{SSB}$ and $N_{ID}^{cell}$ to a plurality of UEs to indicate wake-up.

Here, the specific $\bar{t}_{SSB}$ and $N_{ID}^{cell}$ values may be predefined or transmitted to the UE after being defined through RRC/higher layer signaling.

Meanwhile, when the base station informs the UE of the $\bar{t}_{SSB}$ and $N_{ID}^{cell}$ values defined by the option 1, 2, or 3, the base station may go through a process for grouping UEs in advance. The grouping criteria may consider, for example, UEs having a similar data load, UEs having a similar reception performance, and UEs showing a similar degree of power consumption. After the process of grouping UEs is completed, the same $\bar{t}_{SSB}$ or $N_{ID}^{cell}$ value may be informed to the corresponding group.

In what follows, a CSI-RS as a triggering signal will be described.

A base station may use a CSI-RS and a CSI-RS configuration as a wake-up signal that may be transmitted to a UE.

As one example, a CSI-RS sequence r(m) may be generated as follows.

$$r(m) = \frac{1}{\sqrt{2}}(1 - 2 \cdot c(2m)) + j\frac{1}{\sqrt{2}}(1 - 2 \cdot c(2m+1)) \quad \text{[Eq. 6]}$$

$$c(n) = (x_1(n + N_C) + x_2(n + N_C)) \bmod 2$$

$$x_1(n + 31) = (x_1(n + 3) + x_1(n)) \bmod 2$$

$$x_2(n + 31) = (x_2(n + 3) + x_2(n + 2) + x_2(n + 1) + x_2(n)) \bmod 2$$

$$c_{init} = \sum_{i=0}^{30} x_2(i) \cdot 2^i$$

$$c_{init} = (2^{10}(N_{symb}^{slot} * n_{s,f}^{\mu} + l + 1)(2n_{ID} + 1) + n_{ID}) \bmod 2^{31}$$

At this time, the CSI-RS sequence may be determined through $n_{ID}$ (scramblingID or sequenceGenerationConfig).

Suppose that a CSI-RS sequence may be generated by adjusting the $n_{ID}$ value. If a sequence is generated by using the $n_{ID}$ value agreed on between the base station and the UE to use the reference signal as a wake-up signal, the UE may know upon reception of the corresponding reference signal sequence that the base station has instructed the UE to wake up. In other words, a method for utilizing the CSI-RS as a wake-up signal may be summarized as follows.

The base station defines a specific $n_{ID}$ value or $n_{ID}$ set for generating a reference signal sequence to be used as a wake-up signal and instructs the UE to wake up by transmitting a reference signal using the corresponding $n_{ID}$ or $n_{ID}$ set to the UE.

Here, the specific $n_{ID}$ or $n_{ID}$ set may be predefined or transmitted to the UE after being defined through RRC/ higher layer signaling.

Also, when an $n_{ID}$ set is composed, each value may be used similarly to how $\bar{i}_{SSB}$ of the PBCH DMRS is used to indicate a carrier index, a UE ID, or a state/bandwidth part. In other words, the carrier index, the UE ID, and the state/bandwidth part mapped to each $n_{ID}$ within the set may be configured by the network; or the carrier index, the UE ID, and the state/bandwidth part may be connected implicitly to the index of $n_{ID}$ in a sequential order.

Meanwhile, although a CSI-RS sequence itself may be used as a wake-up signal, the wake-up signal may be provided through a CSI-RS configuration. A value allocated to the UE may be used directly as $n_{ID}$, or a separate value may be used as proposed above; however, a configuration for the CSI-RS transmitted to the UE as a wake-up signal may also be provided separately by the base station.

The base station may provide a configuration for a CSI-RS to be used as a wake-up signal separately to the UE. The UE understands that the corresponding configuration is the information on a resource to which a CSI-RS to be used as a wake-up signal from the UE's point of view may be transmitted; depending on the corresponding configuration, when the CSI-RS is detected, the UE may understand that the base station has transmitted the wake-up signal.

In what follows, application of the PBCH DMRS as a triggering signal will be described.

In the above, a method for generating a reference signal sequence for a wake-up signal by a base station using a specific $n_{ID}$ value has been proposed.

The wake-up signal may be transmitted such that one wake-up signal is defined to one UE; however, a plurality of wake-up signals may be defined for one UE, or the same wake-up signal may be defined for a particular UE group. When a plurality of wake-up signals are defined for one UE, the base station may instruct the UE to wake up under various conditions; and when the same wake-up signal is defined for a plurality of UEs, a single wake-up signal may be used to wake up a plurality of UEs simultaneously.

When a plurality of wake-up signals are defined for one UE, the UE may be in the Carrier Aggregation (CA) condition. For example, when the UE is using two carriers and a wake-up signal is defined for each carrier, the base station may indicate wake-up to the UE for each carrier. For the method above, the following options may be considered. Or, when a plurality of carriers are used, a carrier set may be constructed, and wake-up may be instructed for each carrier set. For example, when the UE is using four carriers, two carrier sets may be constructed, each of which is composed of two carriers; a wake-up signal may be defined for each carrier set; and the base station may indicate wake-up for each carrier set to the UE.

Option 1: The base station defines a specific $n_{ID}$ value for generating a reference signal sequence to be used as a wake-up signal for each carrier/carrier set linked to a UE and transmits a reference signal using the corresponding $n_{ID}$ to the UE to indicate wake-up for each carrier/carrier set.

Here, the specific $n_{ID}$ value may be predefined or transmitted to the UE after being defined through RRC/higher layer signaling.

Option 2: The base station may provide a configuration for a CSI-RS to be used as a wake-up signal for each carrier of the UE. The UE understands that the corresponding configuration is the information on a resource to which a CSI-RS to be used as a wake-up signal from the UE's point of view may be transmitted; depending on the corresponding configuration, when the CSI-RS linked to a specific carrier/carrier set is detected, the UE may understand that the base station has transmitted the wake-up signal and the UE may wake up at the corresponding carrier/carrier set.

Meanwhile, a wake-up signal generated from the option 1 or 2 may also be used for cross-carrier wake up. In other words, when carrier 1/carrier set 1 and carrier2/carrier set 2 are configured for the UE, the base station may transmit a wake-up signal for the carrier 2/carrier set 2 from the carrier 1/carrier set 1 or transmit a wake-up signal for the carrier 1/carrier set 1 from the carrier 2/carrier set 2.

When the base station informs the UE of a carrier set defined by the option 1 or 2, the base station may go through a process for grouping carrier sets in advance. The grouping criteria may consider, for example, carriers having a similar data load, carriers having a similar reception performance, and carriers showing a similar degree of power consumption.

Meanwhile, the following options may be considered for a method defining one wake-up signal for one UE group.

Option 1: The base station defines a specific $n_{ID}$ value for generating a reference signal sequence to be used as a wake-up signal and transmits a reference signal using the corresponding $n_{ID}$ to a plurality of UEs to indicate wake-up.

Here, the specific $n_{ID}$ value may be predefined or transmitted to the UE after being defined through RRC/higher layer signaling.

Option 2: The base station may provide a configuration for a CSI-RS to be used as a wake-up signal separately to a plurality of UEs. The UEs understand that the corresponding configuration is the information on a resource to which a CSI-RS to be used as a wake-up signal from the points of view of the plurality of UEs may be transmitted; depending on the corresponding configuration, when the CSI-RS is detected, the UEs may understand that the base station has transmitted the wake-up signal.

When the base station informs the UE of the $n_{ID}$ value or the CSI-RS configuration defined by the option 1 or 2, the base station may go through a process for grouping UEs in advance. The grouping criteria may consider, for example, UEs having a similar data load, UEs having a similar reception performance, and UEs showing a similar degree of power consumption. After the process of grouping UEs is completed, the same $n_{ID}$ or CSI-RS configuration may be informed to the corresponding group.

In what follows, the PDSCH DMRS as a triggering signal will be described.

As a wake-up signal that may be transmitted by a base station to a UE, the DMRS of the PDSCH may be considered. In one example, a reference signal sequence r(n) of the PDSCH may be composed as follows.

$$r(n) = \frac{1}{\sqrt{2}}(1 - 2 \cdot c(2n)) + j\frac{1}{\sqrt{2}}(1 - 2 \cdot c(2n+1)) \quad \text{[Eq. 7]}$$

$$c(n) = (x_1(n + N_C) + x_2(n + N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2$$

$$c_{init} = \sum_{i=0}^{30} x_2(i) \cdot 2^i$$

-continued $$c_{init} = (2^{17}(N_{symb}^{slot}n_{s,f}^{\mu}+l+1)(2N_{ID}^{nSCID}+1)+2N_{ID}^{nSCID}n_{SCID}) \bmod 2^{31}$$

At this time, the DMRS sequence is determined through the $N_{ID}^{nSCID}$ value and the $n_{SCID}$ value.

Suppose that the DMRS sequence may be generated by adjusting the two values. When a sequence is generated by using the $N_{ID}^{nSCID}$ value or $n_{SCID}$ value agreed on between the base station and the UE to use a reference signal as a wake-up signal, the UE may know upon reception of the corresponding reference signal sequence that the base station has instructed the UE to wake up. In other words, a method for utilizing the DMRS of the PDSCH as a wake-up signal may be summarized as follows.

Option 1: The base station defines a specific $N_{ID}^{nSCID}$ value for generating a reference signal sequence to be used as a wake-up signal and instructs the UE to wake up by transmitting a reference signal using the corresponding $N_{ID}^{nSCID}$ to the UE.

Here, the specific $N_{ID}^{nSCID}$ value may be predefined or transmitted to the UE after being defined through RRC/higher layer signaling.

Option 2: The base station defines a specific $n_{SCID}$ value for generating a reference signal sequence to be used as a wake-up signal and instructs the UE to wake up by transmitting a reference signal using the corresponding $n_{SCID}$ to the UE.

Here, the specific $n_{SCID}$ value may be predefined or transmitted to the UE after being defined through RRC/higher layer signaling.

Option 3: The base station defines specific $N_{ID}^{nSCID}$ and $n_{SCID}$ values for generating a reference signal sequence to be used as a wake-up signal and instructs the UE to wake up by transmitting a reference signal using both of the corresponding $N_{ID}^{nSCID}$ and $n_{SCID}$ to the UE.

Here, the specific $N_{ID}^{nSCID}$ and $n_{SCID}$ values may be predefined or transmitted to the UE after being defined through RRC/higher layer signaling.

Option 4: The $N_{ID}^{nSCID}$ value may be configured for each UE or cell. The UE may obtain the $n_{SCID}$ value from blind decoding of various values, and depending on the result of the corresponding blind decoding, a different interpretation may be obtained. Each detected $n_{SCID}$ value may indicate a different UE operation.

Here, as one example, the $n_{SCID}$ value may be used to represent a UE ID or a UE group ID. As one example, the $n_{SCID}$ value may be regarded as a wake-up signal of a UE corresponding to RNTI % K (where K is a value that may be taken for $n_{SCID}$).

Also, the $n_{SCID}$ value may be used to represent a carrier index. As one example, the $n_{SCID}$ value may be used to indicate an operation for the cells corresponding to CellIndex % K.

Also, the $n_{SCID}$ value may be the power state mode index that the UE has to choose or an index of a power related configuration or an index of a bandwidth part. In other words, the $n_{SCID}$ value may be used to command switching from A state/bandwidth part to B state/bandwidth part.

In what follows, application of the PDSCH DMRS as a triggering signal will be described.

In the above, a method for generating a reference signal sequence for a wake-up signal by a base station using a specific $N_{ID}^{nSCID}$ $n_{SCID}$ value has been proposed.

The wake-up signal may be transmitted such that one wake-up signal is defined to one UE; however, a plurality of wake-up signals may be defined for one UE, or the same wake-up signal may be defined for a particular UE group. When a plurality of wake-up signals are defined for one UE, the base station may instruct the UE to wake up under various conditions; and when the same wake-up signal is defined for a plurality of UEs, a single wake-up signal may be used to wake up a plurality of UEs simultaneously.

When a plurality of wake-up signals are defined for one UE, the UE may be in the Carrier Aggregation (CA) condition. For example, when the UE is using two carriers and a wake-up signal is defined for each carrier, the base station may indicate wake-up to the UE for each carrier. Or, when a plurality of carriers are used, a carrier set may be constructed, and wake-up may be instructed for each carrier set. For example, when the UE is using four carriers, two carrier sets may be constructed, each of which is composed of two carriers; a wake-up signal may be defined for each carrier set; and the base station may indicate wake-up for each carrier set to the UE.

For the method above, the following options may be considered.

Option 1: The base station defines a specific $N_{ID}^{nSCID}$ value for generating a reference signal sequence to be used as a wake-up signal for each carrier/carrier set linked to a UE and transmits a reference signal using the corresponding $N_{ID}^{nSCID}$ to the UE to indicate wake-up for each carrier/carrier set.

Here, the specific $N_{ID}^{nSCID}$ value may be predefined or transmitted to the UE after being defined through RRC/higher layer signaling.

Option 2: The base station defines a specific $n_{SCID}$ value for generating a reference signal sequence to be used as a wake-up signal for each carrier/carrier set linked to a UE and transmits a reference signal using the corresponding $n_{SCID}$ to the UE to indicate wake-up for each carrier/carrier set.

Here, the specific $n_{SCID}$ value may be predefined or transmitted to the UE after being defined through RRC/higher layer signaling.

Option 3: The base station defines specific $N_{ID}^{nSCID}$ and $n_{SCID}$ values for generating a reference signal sequence to be used as a wake-up signal for each carrier/carrier set linked to a UE and transmits a reference signal using both of the corresponding $N_{ID}^{nSCID}$ and $n_{SCID}$ to the UE to indicate wake-up.

Here, the specific $N_{ID}^{nSCID}$ and $n_{SCID}$ values may be predefined or transmitted to the UE after being defined through RRC/higher layer signaling.

Meanwhile, a wake-up signal generated from the option 1, 2, or 3 may also be used for cross-carrier wake up. In other words, when carrier 1/carrier set 1 and carrier2/carrier set 2 are configured for the UE, the base station may transmit a wake-up signal for the carrier 2/carrier set 2 from the carrier 1/carrier set 1 or transmit a wake-up signal for the carrier 1/carrier set 1 from the carrier 2/carrier set 2.

Also, when the base station informs the UE of a carrier set defined by the option 1, 2, or 3, the base station may go through a process for grouping carrier sets in advance. The grouping criteria may consider, for example, carriers having a similar data load, carriers having a similar reception performance, and carriers showing a similar degree of power consumption.

Meanwhile, the following options may be considered for a method defining one wake-up signal for one UE group.

Option 1: The base station defines a specific $N_{ID}^{nSCID}$ value for generating a reference signal sequence to be used as a wake-up signal and transmits a reference signal using the corresponding $N_{ID}^{nSCID}$ to a plurality of UEs to indicate wake-up.

Here, the specific $N_{ID}^{nSCID}$ value may be predefined or transmitted to the UE after being defined through RRC/higher layer signaling.

Option 2: The base station defines a specific $n_{SCID}$ value for generating a reference signal sequence to be used as a wake-up signal and transmits a reference signal using the corresponding $n_{SCID}$ to a plurality of UEs to indicate wake-up.

Here, the specific $n_{SCID}$ value may be predefined or transmitted to the UE after being defined through RRC/higher layer signaling.

Option 3: The base station defines specific $N_{ID}^{nSCID}$ and $n_{SCID}$ values for generating a reference signal sequence to be used as a wake-up signal and transmits a reference signal using both of the corresponding $N_{ID}^{nSCID}$ and $n_{SCID}$ to a plurality of UEs to indicate wake-up.

Here, the specific $N_{ID}^{nSCID}$ and $n_{SCID}$ values may be predefined or transmitted to the UE after being defined through RRC/higher layer signaling.

Also, when the base station informs the UE of the $N_{ID}^{nSCID}$ and $n_{SCID}$ values defined by the option 1, 2, or 3, the base station may go through a process for grouping UEs in advance. The grouping criteria may consider, for example, UEs having a similar data load, UEs having a similar reception performance, and UEs showing a similar degree of power consumption. After the process of grouping UEs is completed, the same $N_{ID}^{nSCID}$ or $n_{SCID}$ value may be informed to the corresponding group.

In what follows, offset control for a wake-up signal will be described.

When the wake-up signal above, which is a modified form of an existing reference signal, is used, an offset from the corresponding reference signal configuration may be applied to the symbol axis and the subcarrier axis to prevent the wake-up signal from being overlapped with a resource of the existing reference signal.

When a wake-up signal in a modified form of a reference signal is used, reference signal mapping may follow the resource mapping of the original reference signal; at this time, since each reference signal and the wake-up signal may be transmitted from the base station by being overlapped with each other, the base station may separately inform the UE of the offsets of the wake-up signal's symbol axis and subcarrier axis so that the UE does not confuse the reference signal and the wake-up signal to be received normally.

In what follows, a resource configuration for a wake-up signal will be described.

A wake-up signal may be defined in the form of a resource. Regardless of in which form a wake-up signal is transmitted, the base station may define the scope and the use of a resource so that a UE may interpret whichever signal transmitted to a specific resource as a wake-up signal. A specific method for this purpose may have the following options.

Option 1: The option 1 may use all of the symbols and inform the UE of a symbol index within a slot to which a wake-up signal is transmitted. In one example, the option 1 may inform the UE of the OFDM symbol and the frequency region.

Option 2: The option 2 may inform the UE of a symbol that may be used as a wake-up signal, a resource element group (REG), and a control channel element (CCE). In one example, the option 2 may inform the UE of the symbol index and the maximum value of the REG (for example, X when REG 0 to REG X are used).

Option 3: The option 3 may inform the UE of a symbol that may be used as a wake-up signal, an REG, and a CCE. Different from the option 2, the option 3 may inform the UE of the maximum and minimum values of the REG (for example, X and Y when REG X to REG Y are used).

In what follows, $c_{init}$ control for a wake-up signal will be described.

When the wake-up signal in a modified form of an existing reference signal as proposed above is used, subparameters constituting $c_{init}$ may be converted to be used as a wake-up signal; however, the $c_{init}$ itself may be converted to be used as a wake-up signal. A method for utilizing $c_{init}$ may use the options described above without modifications.

In what follows, an additional payload for a wake-up signal will be described.

When a wake-up signal is composed in a particular form of data or control information and a signal in a modified form of an existing reference signal as proposed above (for example, an intro signal) is received, the UE may receive a wake-up signal in the form of a payload. At this time, the wake-up signal may include information on a UE to wake up, information on the corresponding carrier/carrier set, and cell information. As one example, a wake-up signal received by a UE may include information on a cell on which the UE has to perform PDCCH monitoring.

Here, a resource for a wake-up signal in the form of a payload may be defined separately. Also, a resource related to an intro signal in the form of a reference signal may be always defined, and a wake-up signal may be received from the corresponding resource. The base station may inform the UE of a resource for a wake-up signal in the form of a payload, for which a method for configuring a resource for the wake-up signal described above may be used.

In what follows, a discontinuous reception method performed by a UE according to partial implementation of the present disclosure will be described.

Figure 29:
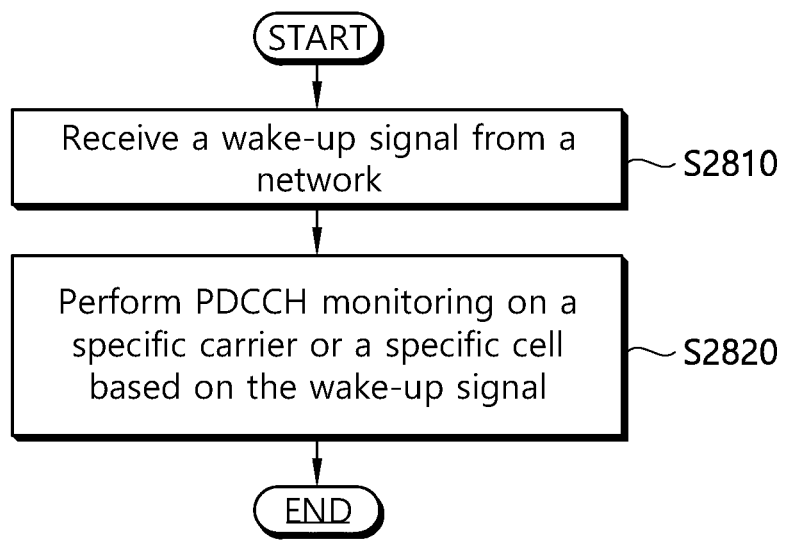
FIG. 29 is a flow diagram illustrating a discontinuous reception method performed by a UE according to partial implementation of the present disclosure.

FIG. 29 is a flow diagram illustrating a discontinuous reception method performed by a UE according to partial implementation of the present disclosure.

According to FIG. 29, the UE receives a wake-up signal from the network S2910.

Afterward, the UE performs PDCCH monitoring on a specific carrier or cell based on the wake-up signal S2920.

Here, the wake-up signal may inform the UE of the specific carrier or the specific cell on which the UE performs PDCCH monitoring. For example, when the UE performs a carrier aggregation operation and the UE camps on/uses cell A, cell B, cell C, ad cell D, the wake-up signal may inform the UE of the cell B. The UE receiving the wake-up signal may perform PDCCH monitoring on the cell B but may not perform PDCCH monitoring on other cells (namely, cell A, cell C, and cell D). Also, the wake-up signal may be transmitted on the primary cell (PCell). Meanwhile, in the example above, only the configuration in which a wake-up signal informs the UE of a specific cell is disclosed; however, the present disclosure is not limited to the example above but may inform the UE of a specific carrier or both of a specific cell and a specific carrier.

Also, the wake-up signal may have a sequence corresponding to each of the carriers used by the UE. In other words, a sequence of the wake-up signal may be defined for each cell/carrier used by the UE. Therefore, when the UE receives the wake-up signal, the UE may check the sequence of the wake-up signal and determine a specific cell/specific carrier on which the UE has to perform PDCCH monitoring.

In addition to the embodiment above, various other embodiments proposed by the present disclosure may be applied to the method above, where repeated descriptions will be omitted. Also, the respective steps of FIG. 28 may be implemented by the device described later.

Figure 30:
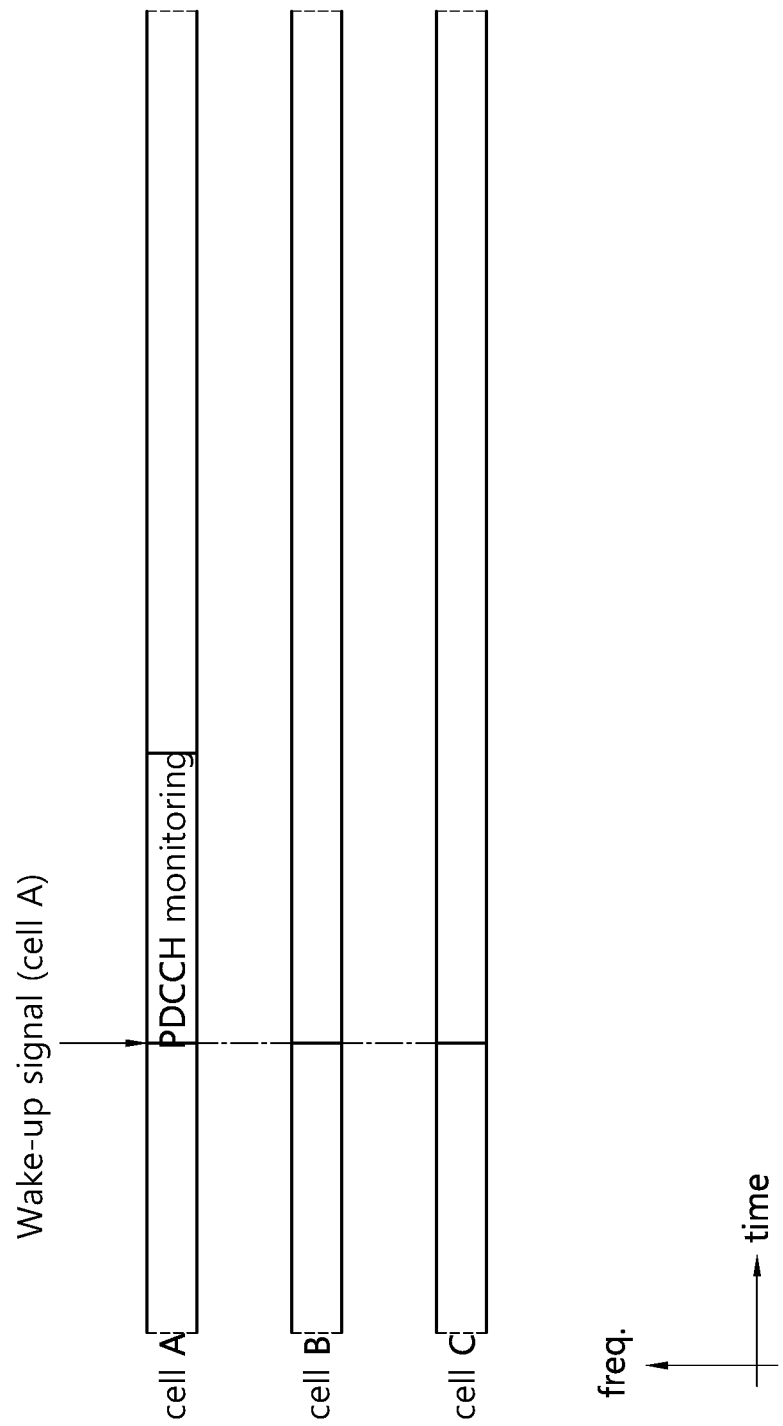
FIG. 30 illustrates an embodiment in which a discontinuous reception method is performed by a UE according to partial implementation of the present disclosure.

FIG. 30 illustrates an embodiment in which a discontinuous reception method is performed by a UE according to partial implementation of the present disclosure.

In FIG. 30, cell A, cell B, and cell C used by a UE are shown. Here, the UE may receive a wake-up signal, and the wake-up signal may inform the UE of the cell A.

The UE which has received a wake-up signal informing of the cell A may perform PDCCH monitoring on the cell A but may not perform PDCCH monitoring on the cell B and the cell C. In one example, the UE may perform the conventional DRX operation on each of the cell B and the cell C or maintain a sleep duration state for the cell B and the cell C.

Also, the UE may receive the wake-up signal on the primary cell (PCell). For example, for cell A, cell B, and cell C shown in FIG. 30, when each of the cell A and the cell B is the secondary cell (SCell), and the cell C is the primary cell, the UE may receive a wake-up signal on the cell C and perform PDCCH monitoring on the cell A informed by the wake-up signal.

Meanwhile, although FIG. 30 illustrates an embodiment using cells, the embodiment of FIG. 30 may also be applied to the case using carriers as described above. In other words, cell A, cell B, and cell C of FIG. 30 may be carrier A, carrier B, and carrier C, respectively. Furthermore, various embodiments of the present disclosure may also be applied to the embodiment of FIG. 30, where repeated descriptions will be omitted.

In what follows, a go-to-sleep signal will be described.

The description above proposes a wake-up signal that informs of whether a UE in the C-DRX state actually wakes up according to an activation timer.

In what follows, contrary to the description above, a go-to-sleep signal that makes a UE in the active state transition to the C-DRX state will be proposed.

In one example, when a UE in the active state receives a go-to-sleep signal, the UE may quickly transition again to the sleep state. Or, a signal that switches a power state may also be considered. The corresponding signal may be transmitted periodically or non-periodically for the purpose of indicating transition of various power states. Receiving the corresponding indication, the UE may interpret the indication as a command that instructs the UE to switch the power state. The purpose of the signal may be many and varied, and in the following, the present disclosure proposes a method for transmitting the signal together with specific information (for example, wake-up, go-to-sleep, or state transition) in a reliable manner. Therefore, the corresponding proposal may also be applied commonly to the indication (from the network to the UE or from the UE to the network) used to reduce or effectively control power consumption.

The signal may be transmitted periodically according to the DRX period or transmitted non-periodically only at the occurrence of a specific event or more specifically, transmitted by being combined with a different signal/channel (for example, scheduling DCI or SFI indication).

In addition to the above, the go-to-sleep signal may consider the following functions.

Function 1: Suppose that a UE enters the active state according to an activation timer or a control channel's scheduling or signaling of a separate base station and that the base station determines it unnecessary to communicate with the UE until the C-DRX state in the future. The base station may then transmit a go-to-sleep signal to the UE to make the UE transition to the DRX state immediately. In this case, the UE transitions to the DRX state during the remaining active period; when the UE has to follow the next C-DRX/activation timer configuration, it operates according to the corresponding configuration.

Function 2: Similarly to how the wake-up signal is used, the base station may inform the UE that a go-to-sleep signal related to the activation timer may be transmitted before the corresponding timer. When the UE receives the go-to-sleep signal, the UE may maintain the DRX state during the activation timer related to the corresponding go-to-sleep signal.

Separately from the functions above, a method for defining a go-to-sleep signal may reuse the signals described above by substituting only the functions of the signals with the functions related to the go-to-sleep signal. Also, the go-to-sleep signal providing the functions above may be implemented by a different configuration. What is important is the presence of a signal from the base station, which makes the UE go to sleep.

Meanwhile, the appended claims of the present disclosure may be combined in various ways. For example, technical features of method claims of the present disclosure may be combined to be implemented as an apparatus, and technical features of apparatus claims of the present disclosure may be combined to be implemented as a method. Also, technical features of method claims and technical features of apparatus claims of the present disclosure may be combined to be implemented as an apparatus, and technical features of method claims and technical features of apparatus claims of the present disclosure may be combined to be implemented as a method.

In what follows, a device to which embodiments of the present disclosure may be applied will be described.

Although not limited to the descriptions below, various descriptions, functions, procedures, proposals, methods, and/or operation flow diagrams of the present disclosure may be applied to various fields requiring wireless communication/connection (for example, 5G) among devices.

In what follows, the present disclosure will be described in more detail with reference to appended drawings. Unless specified differently, the same drawing symbols in the following drawings/descriptions may illustrate the same or corresponding hardware block, software block, or functional block.

Figure 31:
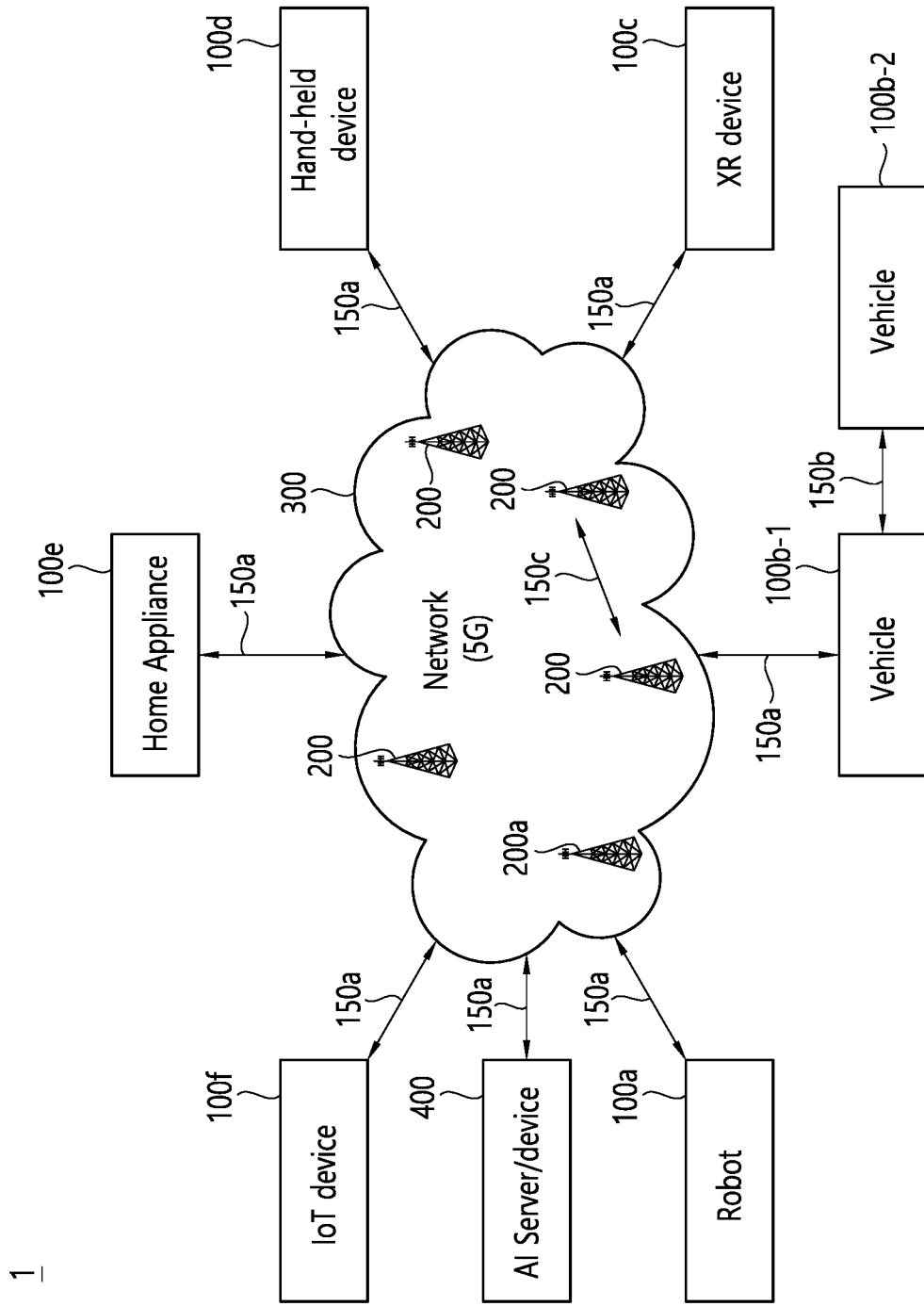
FIG. 31 illustrates a communication system 1 to which the present disclosure is applied.

FIG. 31 illustrates a communication system 1 to which the present disclosure is applied.

Referring to FIG. 31, the communication system 1 applied to the present disclosure includes a wireless device, a base station, and a network. Here, a wireless device refers to a device performing communication using a wireless access technology (for example, 5G New RAT (NR) or Long Term Evolution (LTE)) and may be referred to as a communication/wireless/5G device. Although not limited to the examples below, the wireless device may include a robot 100a, a vehicle 100b-1, 100b-2, an eXtended Reality (XR) device 100c, a hand-held device 100d, a home appliance 100e, an Internet of Things (IoT) device 100f, and an AI device/server 400. For example, the vehicle may include a vehicle equipped with a wireless communication function, a self-driving vehicle, and a vehicle capable of performing vehicle-to-vehicle communication. Here, the vehicle may include an Unmanned Aerial Vehicle (UAV) (for example, a drone). The XR device includes an Augmented Reality (AR)/Virtual Reality (VR)/Mixed Reality (MR) device and may be implemented in the form of a Head-Mounted Device (HMD), a Head-Up Display (HUD) installed in a vehicle, a television, a smartphone, a computer, a wearable device, a home appliance, a digital signage, a vehicle, or a robot. The hand-held device may include a smartphone, a smart pad, a wearable device (for example, a smart watch or smart glass), and a computer (for example, a notebook computer). The home appliance may include a TV, a refrigerator, and a washing machine. The IoT device may include a sensor and a smart meter. For example, the base station and the network may be implemented by wireless devices, and a specific wireless device 200a may operate as a base station/network node to other wireless devices.

The wireless device 100a-100f may be connected to the network 300 through the base station 200. Artificial Intelligence (AI) technology may be applied to the wireless device 100a-100f, and the wireless device 100a-100f may be connected to the AI server 400 through the network 300. The network 300 may be constructed using the 3G network, 4G (for example, LTE) network, or 5G (for example, NR) network. Although the wireless device 100a-100f may communicate with each other through the base station 200/network 300 but may perform direct communication (for example, sidelink communication) without involving the base station/network. For example, vehicles 100b-1, 100b-2 may perform direct communication (for example, Vehicle to Vehicle (V2V)/Vehicle to everything (V2X) communication). Also, the IoT device (for example, a sensor) may perform direct communication with other IoT devices (for example, sensors) or other wireless devices 100a-100f.

Wireless communication/connection 150a, 150b, 150c may be established between the wireless device 100a-100f/ base station 200 and the base station 200/base station 200. Here, wireless communication/connection may be established through various wireless access technologies (for example, 5G NR) such as uplink/downlink communication 150a and sidelink communication 150b (or D2D communication) or communication 150c between base stations (for example, relay or Integrated Access Backhaul (IAB)). A wireless device and a base station/wireless device or base stations may transmit/receive a wireless signal to and from each other through wireless communication/connection 150a, 150b, 150c. For example, wireless communication/ connection 150a, 150b, 150c may transmit/receive a signal through various physical channels. To this purpose, based on various proposals of the present disclosure, at least part of a process for configuring various pieces of configuration information for transmission/reception of a wireless signal, a process for handling various signals (for example, channel encoding/decoding, modulation/demodulation, and resource mapping/demapping), and a resource allocation process may be performed.

Meanwhile, NR provides a plurality of numerologies (or subcarrier spacing (SCS)) for supporting various 5G services. For example, when SCS is 15 kHz, NR supports a wide area for the conventional cellular bands; when SCS is 30 kHz/60 kHz, NR supports dense-urban areas, lower latency, and wider carrier bandwidth; and when SCS is 60 kHz or higher, NR supports bandwidth larger than 24.25 GHz to overcome phase noise.

An NR frequency band may be defined by two types (FR1, FR2) of frequency ranges. The numerical values of a frequency range may be changed; for example, the two types (FR1, FR2) of frequency ranges are given as shown in Table 10 below. For the convenience of descriptions, among the frequency ranges used in the NR system, FR1 may refer to "sub 6 GHz range" while FR2 may refer to "above 6 GHz range" and may be called the millimeter wave (mmW) range.

TABLE 10

| Frequency designation range | Corresponding frequency range | Subcarrier spacing |
|---|---|---|
| FR1 | 450 MHz-6000 MHz | 15, 30, 60 kHz |
| FR2 | 24250 MHz-52600 MHz | 60, 120, 240 kHz |

As described above, the numerical values of a frequency range of the NR system may be changed. For example, as shown in Table 11 below, FR1 may include a frequency band ranging from 410 MHz to 7125 MHz. In other words, FR1 may include a frequency band larger than 6 GHz (or 5850, 5900, 5925 MHz). For example, a frequency band larger than 6 GHz (or 5850, 5900, 5925 MHz) included within FR1 may include an unlicensed band. The unlicensed band may be used for various uses, for example, communication for vehicles (such as autonomous driving).

TABLE 11

| Frequency designation range | Corresponding frequency range | Subcarrier spacing |
|---|---|---|
| FR1 | 410 MHz-7125 MHz | 15, 30, 60 kHz |
| FR2 | 24250 MHz-52600 MHz | 60, 120, 240 kHz |

Figure 32:
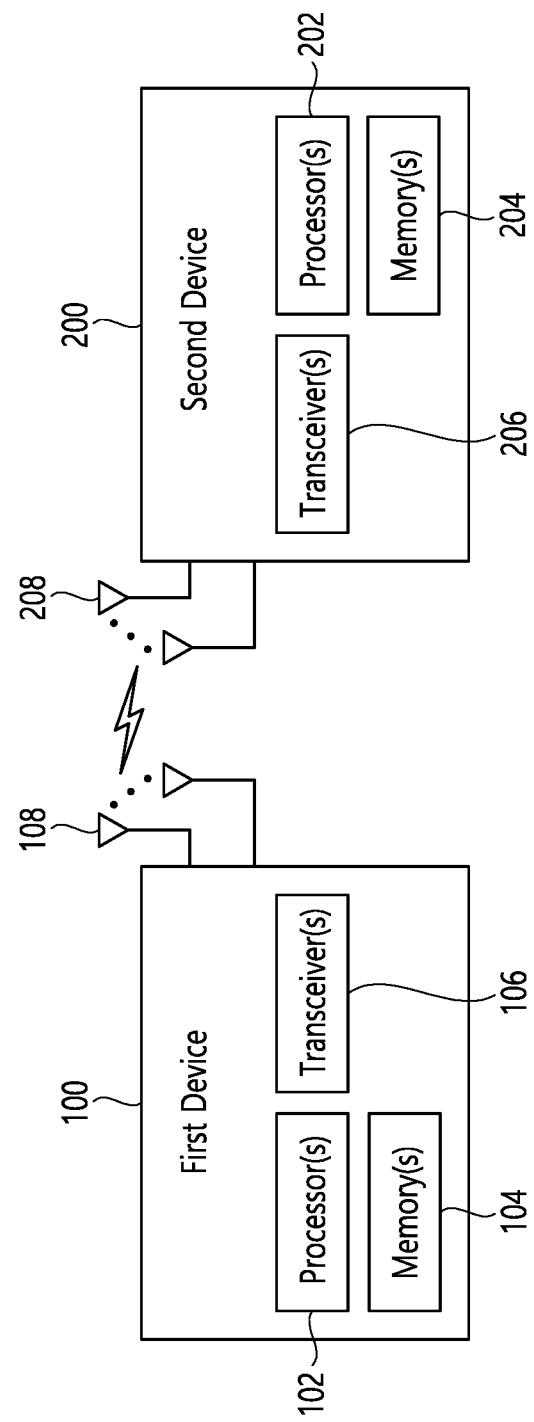
FIG. 32 illustrates a wireless device that may be applied to the present disclosure.

FIG. 32 illustrates a wireless device that may be applied to the present disclosure.

Referring to FIG. 32, a first wireless device 100 and a second wireless device 200 may transmit and receive a wireless signal through various wireless access technologies (for example, LTE or NR). Here, the first wireless device 100 (second wireless device 200) may correspond to the wireless device 100x (base station 200) of FIG. 31 and/or wireless device 100x (wireless device 100x).

The first wireless device 100 may include one or more processors 102 and one or more memories 104 and may further include one or more transceivers 106 and/or one or more antennas 108. The processor 102 may control the memory 104 and/or the transceiver 106 and may be configured to implement the descriptions, functions, procedures, proposals, methods, and/or operation flow diagrams of the present disclosure. For example, the processor 102 may process information within the memory 104 to generate first information/signal and transmit a wireless signal including the first information/signal through the transceiver 106. After receiving a wireless signal including second information/signal through the transceiver 106, the processor 102 may store the information obtained from signal processing of the second information/signal to the memory 104. The memory 104 may be connected to the processor 102 and store various pieces of information related to the operation of the processor 102. For example, the memory 104 may store software code including commands for performing the whole or part of the processes controlled by the processor 102 or the descriptions, functions, procedures, proposals, methods, and/or operation flow diagrams of the present disclosure. Here, the processor 102 and the memory 104 may be part of a communication model/circuit/chip designed to implement a wireless communication technology (for example, LTE, NR). The transceiver 106 may be connected to the processor 102 and transmit and/or receive a wireless signal through one or more antennas 108. The transceiver 106 may include a transmitter and/or a receiver. The transceiver 106 may be used interchangeably with a Radio Frequency (RF) unit. The wireless device according to the present disclosure may refer to a communication modem/circuit/chip.

The second wireless device 200 may include one or more processors 202 and one or more memories 204 and may further include one or more transceivers 206 and/or one or more antennas 208. The processor 202 may control the memory 204 and/or the transceiver 206 and may be configured to implement the descriptions, functions, procedures, proposals, methods, and/or operation flow diagrams of the present disclosure. For example, the processor 202 may process information within the memory 204 to generate third information/signal and transmit a wireless signal including the third information/signal through the transceiver 206. After receiving a wireless signal including fourth information/signal through the transceiver 206, the processor 202 may store the information obtained from signal processing of the fourth information/signal to the memory 204. The memory 204 may be connected to the processor 202 and store various pieces of information related to the operation of the processor 202. For example, the memory 204 may store software code including commands for performing the whole or part of the processes controlled by the processor 202 or the descriptions, functions, procedures, proposals, methods, and/or operation flow diagrams of the present disclosure. Here, the processor 202 and the memory 204 may be part of a communication model/circuit/chip designed to implement a wireless communication technology (for example, LTE, NR). The transceiver 206 may be connected to the processor 202 and transmit and/or receive a wireless signal through one or more antennas 208. The transceiver 206 may include a transmitter and/or a receiver. The transceiver 206 may be used interchangeably with a Radio Frequency (RF) unit. The wireless device according to the present disclosure may refer to a communication modem/circuit/chip.

In what follows, hardware components of the wireless device 100, 200 will be described in detail. Although not limited to the description below, one or more protocol layers may be implemented by one or more processors 102, 202. For example, one or more processors 102, 202 may implement one or more layers (for example, functional layers such as PHY, MAC, RLC, PDCP, RRC, and SDAP). One or more processors 102, 202 may generate one or more Protocol Data Units (PDUs) and/or one or more Service Data Units (SDUs) according to the descriptions, functions, procedures, proposals, methods, and/or operation flow diagrams of the present disclosure. One or more processors 102, 202 may generate messages, control information, data, or information according to the descriptions, functions, procedures, proposals, methods, and/or operation flow diagrams of the present disclosure. One or more processors 102, 202 may generate a signal (for example, a baseband signal) including PDUs, SDUs, messages, control information, data, or information according to the functions, procedures, proposals, and/or methods of the present disclosure and provide the generated signal to one or more transceivers 106, 206. One or more processors 102, 202 may receive a signal (for example, a baseband signal) from one or more transceivers 106, 206 and obtain PDUs, SDUs, messages, control information, data, or information according to the descriptions, functions, procedures, proposals, methods, and/or operation flow diagrams of the present disclosure.

One or more processors 102, 202 may be referred to as a controller, a micro-controller, a micro-processor, or a micro-computer. One or more processors 102, 202 may be implemented by hardware, firmware, software, or a combination thereof. As one example, one or more processors 102, 202 may include one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs). The descriptions, functions, procedures, proposals, methods, and/or operation flow diagrams of the present disclosure may be implemented using firmware or software, and the firmware or software may be implemented to include modules, procedures, functions, and so on. The firmware or software configured to perform the descriptions, functions, procedures, proposals, methods, and/or operation flow diagrams of the present disclosure may be included in one or more processors 102, 202 or stored in one or more memories 104, 204 to be operated by one or more processors 102, 202. The descriptions, functions, procedures, proposals, methods, and/or operation flow diagrams of the present disclosure may be implemented using firmware or software in the form of commands and/or a set of commands.

One or more memories 104, 204 may be connected to one or more processors 102, 202 and store various forms of data, signals, messages, information, programs, code, instructions, and/or commands. One or more memories 104, 204 may be composed of a ROM, a RAM, an EPROM, a flash memory, a hard drive, a register, a cache memory, a computer-readable storage medium, and/or a combination thereof. One or more memories 104, 204 may be installed inside and/or outside of one or more processors 102, 202. Also, one or more memories 104, 204 may be connected to one or more processors 102, 202 through various technologies such as wired or wireless connection.

One or more transceivers 106, 206 may transmit user data, control information, wireless signals/channels mentioned in the methods and/or operation flow diagrams of the present disclosure to one or more different devices. One or more transceivers 106, 206 may receive user data, control information, or wireless signals/channels mentioned in the descriptions, functions, procedures, proposals, methods, and/or operation flow diagrams of the present disclosure from one or more different devices. For example, one or more transceivers 106, 206 may be connected to one or more processors 102, 202 and transmit and receive wireless signals. For example, one or more processors 102, 202 may control one or more transceivers 106, 206 to transmit user data, control information, or wireless signals to one or more different devices. Also, one or more processors 102, 202 may control one or more transceivers 106, 206 to receive user data, control information, or wireless signals from one or more different devices. Also, one or more transceivers 106, 206 may be connected to one or more antennas 108, 208, and one or more transceivers 106, 206 may be configured to transmit and receive user data, control information, or wireless signals/channels mentioned in the descriptions, functions, procedures, proposals, methods, and/or operation flow diagrams of the present disclosure through one or more antennas 108, 208. In the present disclosure, one or more antennas may be a plurality of physical antennas or a plurality of logical antennas (for example, antenna ports). To process received user data, control information, or wireless signals/channels using one or more processors 102, 202, one or more transceivers 106, 206 may convert the received user data, control information, or wireless signals/channels from RF band signals to baseband signals. One or more transceivers 106, 206 may convert the processed user data, control information, or wireless signals/channels from baseband signals to RF band signals using one or more processors 102, 202. To this purpose, one or more transceivers 106, 206 may include (analog) oscillators and/or filters.

Figure 33:
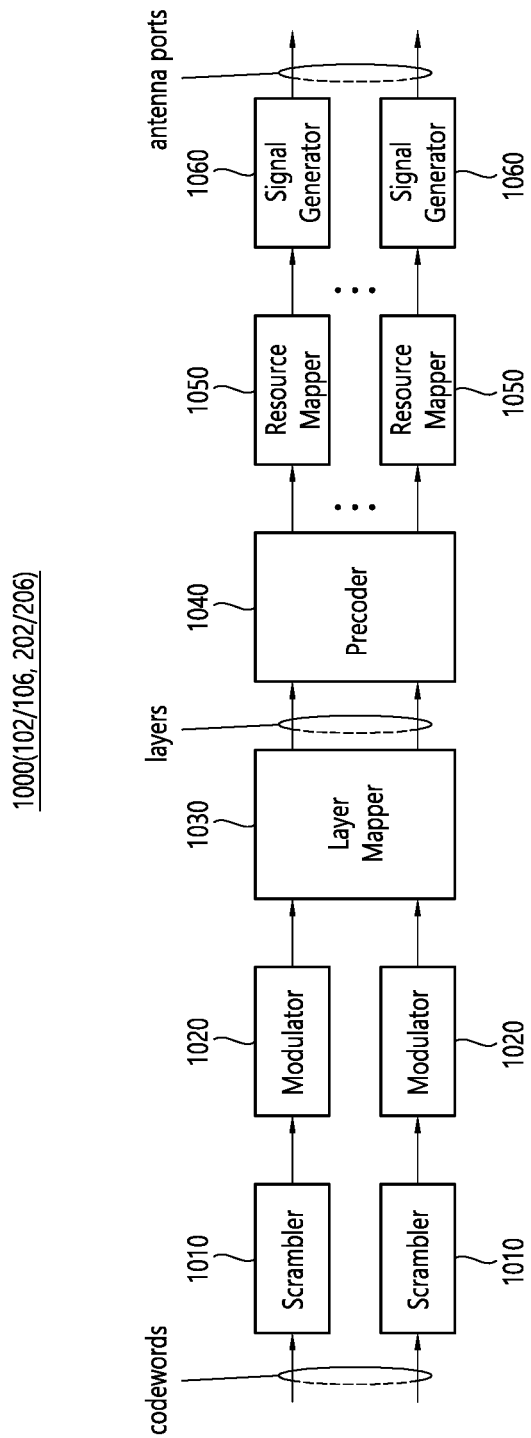
FIG. 33 illustrates a signal processing circuit for transmitted signals.

FIG. 33 illustrates a signal processing circuit for transmitted signals.

Referring to FIG. 33, the signal processing circuit 1000 may include a scrambler 1010, a modulator 1020, a layer mapper 1030, a precoder 1040, a resource mapper 1050, and a signal generator 1060. Although not limited to the description below, the operations/functions of FIG. 33 may be performed by the processor 102, 202 and/or transceiver 106, 206 of FIG. 32. Hardware components of FIG. 33 may be implemented by the processor 102, 202 and/or transceiver 106, 206 of FIG. 32. For example, blocks 1010-1060 may be implemented by the processor 102, 202 of FIG. 32. Also, blocks 1010-1050 may be implemented by the processor 102, 202 of FIG. 32, and block 1060 may be implemented by the transceiver 106, 206 of FIG. 32.

A codeword may be converted to a wireless signal through the signal processing circuit 1000 of FIG. 33. Here, a codeword is a coded bit sequence of an information block. An information block may include a transport block (for example, an UL-SCH transport block or a DL-SCH transport block). A wireless signal may be transmitted through various physical channels (for example, PUSCH or PDSCH).

More specifically, a codeword may be converted to a scrambled bit sequence by the scrambler 1010. A scramble sequence used for scrambling may be generated based on an initial value, where the initial value may include ID information for a wireless device. The scrambled bit sequence may be modulated into a modulated symbol sequence by the modulator 1020. Modulation methods may include pi/2-Binary Phase Shift keying (BPSK), m-Phase Shift Keying (PSK), and m-Quadrature Amplitude Modulation (QAM). A complex modulation symbol sequence may be mapped to one or more transport layers by the layer mapper 1030. Modulation symbols of each transport layer may be mapped (precoded) to the corresponding antenna port(s) by the precoder 1040. The output z of the precoder 1040 may be obtained by multiplication of the output y of the layer mapper 1030 with an N-by-M precoding matrix W. Here, N represents the number of antenna ports, and M represents the number of transport layers. The precoder 1040 may perform precoding after performing transform precoding (for example, DFT transform) on the complex modulation symbols. Also, the precoder 1040 may perform precoding without performing the transform precoding.

The resource mapper 1050 may map modulation symbols of each antenna port to time-frequency resources. The time-frequency resources may include a plurality of symbols (for example, CP-OFDMA symbols and DFT-s-OFDMA symbols) in the time domain and include a plurality of subcarriers in the frequency domain. The signal generator 1060 may generate a wireless signal from the mapped modulation symbols, and the generated wireless signal may be transmitted to other devices through each antenna. To this purpose, the signal generator 1060 may include an Inverse Fast Fourier Transform (IFFT) module, a Cyclic Prefix (CP) inserter, a Digital-to-Analog Converter (DAC), and a frequency uplink converter.

The signal processing steps for processing a received signal in a wireless device may be implemented in the reverse order of the signal processing steps 1010-1060 of FIG. 33. For example, a wireless device (for example, 100, 200 of FIG. 32) may receive a wireless signal from the outside through an antenna port/transceiver. The received wireless signal may be converted to a baseband signal through a signal restorer. To this purpose, the signal restorer may include a frequency downlink converter, an analog-to-digital converter (ADC), a CP remover, and a Fast Fourier Transform (FFT) module. Afterward, the baseband signal may be restored to a codeword through a resource de-mapper process, a postcoding process, a demodulation process, and a de-scrambling process. A codeword may be restored to the original information block through decoding. Therefore, a signal processing circuit (not shown) for a received signal may include a signal restorer, a resource de-mapper, a postcoder, a demodulator, a de-scrambler, and a decoder.

Figure 34:
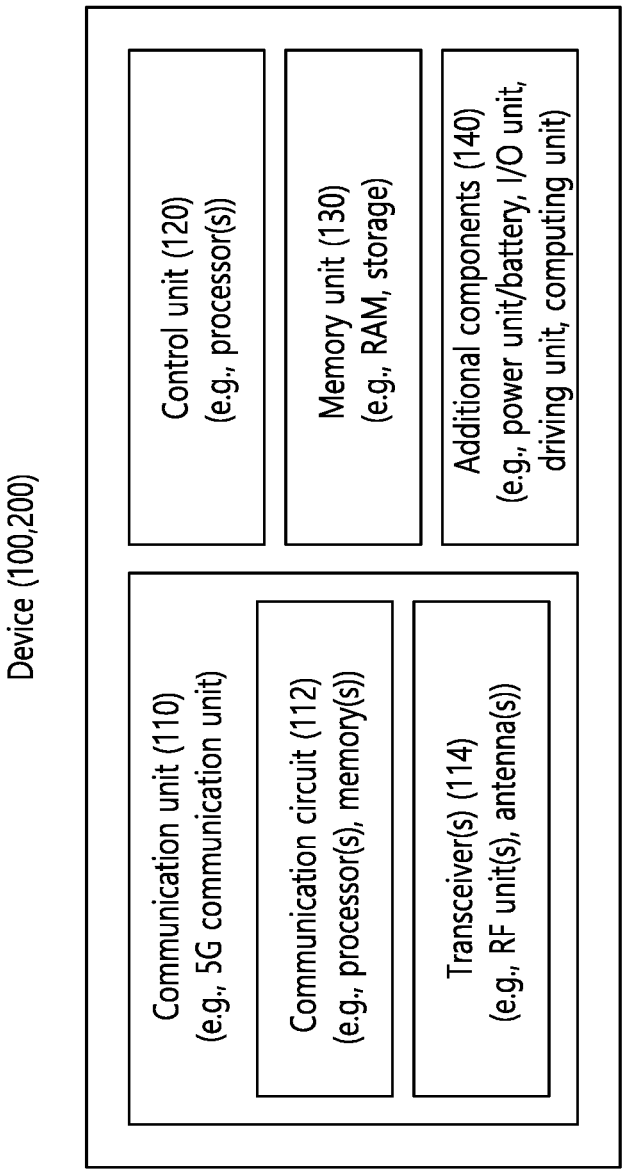
FIG. 34 illustrates another example of a wireless device that may be applied to the present disclosure.

FIG. 34 illustrates another example of a wireless device that may be applied to the present disclosure. Depending on a use case/service, the wireless device may be implemented in various forms (refer to FIG. 31).

Referring to FIG. 34, a wireless device 100, 200 may correspond to the wireless device 100, 200 of FIG. 32 and may be composed of various elements, components, units, and/or modules. For example, the wireless device 100, 200 may include a communication unit 110, a controller 120, a memory 130, and an additional element 140. The communication unit may include a communication circuit 112 and a transceiver(s) 114. For example, the communication circuit 112 may include one or more processors 102, 202 of FIG. 32 and/or one or more memories 104, 204. For example, the transceiver(s) 114 may include one or more transceivers 106, 206 and/or one or more antennas 108, 208 of FIG. 32. The controller 120 is connected to the communication unit 110, memory 130, and additional element 140 electrically and controls the overall operation of the wireless device. For example, the controller 120 may control electric/mechanical operations of the wireless device based on the program/code/commands/information stored in the memory 130. Also, the controller 120 may transmit the information stored in the memory to the outside (for example, another communication device) through the communication unit 110 via a wireless/wired interface or store information received from the outside (for example, another communication device) via the wireless/wired interface through the communication unit 110 into the memory 130.

The additional element 140 may be composed in various ways depending on the type of the wireless device. For example, the additional element 140 may include at least one of a power unit/battery, an input/output (I/O) unit, a driving unit, and a computing unit. Although not limited to the description below, the wireless device may be implemented in the form of a robot (FIG. 31, 100a), a vehicle (FIG. 31, 100b-1, 100b-2), an XR device (FIG. 31, 100c), a hand-held device (FIG. 31, 100d), a home appliance (FIG. 31, 100e), an IoT device (FIG. 31, 100f), a digital broadcast terminal, a hologram device, a public safety device, an MTC device, a medical device, a fintech device (or a financial device), a security device, a climate/environment device, an AI server/device (FIG. 31, 400), a base station (FIG. 31, 200), and a network node. The wireless device may be mobile or used at a fixed place depending on a use-case/service.

All of the various elements, components, units, and/or modules within the wireless device of FIG. 34 may be connected to each other through a wired interface, or at least part of them may be connected to each other wirelessly through the communication unit 110. For example, the controller 120 and the communication unit 110 are connected to each other through a wired interface within the wireless device 100, 200 while the controller 120 and the first unit (for example, 130, 140) may be connected to each other wirelessly through the communication unit 110. Also, each element, component, unit, and/or module within the wireless device 100, 200 may further include one or more elements. For example, the controller 120 may be composed of a set of one or more processors. For example, the controller 120 may be composed of a communication control processor, an application processor, an Electronic Control Unit (ECU), a graphic processing processor, and a memory control processor. In another example, the memory 130 may be composed of a Random Access Memory (RAM), a Dynamic RAM (DRAM), a Read Only Memory (ROM), a flash memory, a volatile memory, a non-volatile memory, and/or a combination thereof.

In what follows, an implementation example of FIG. 34 will be described in more detail with reference to a related drawing.

Figure 35:
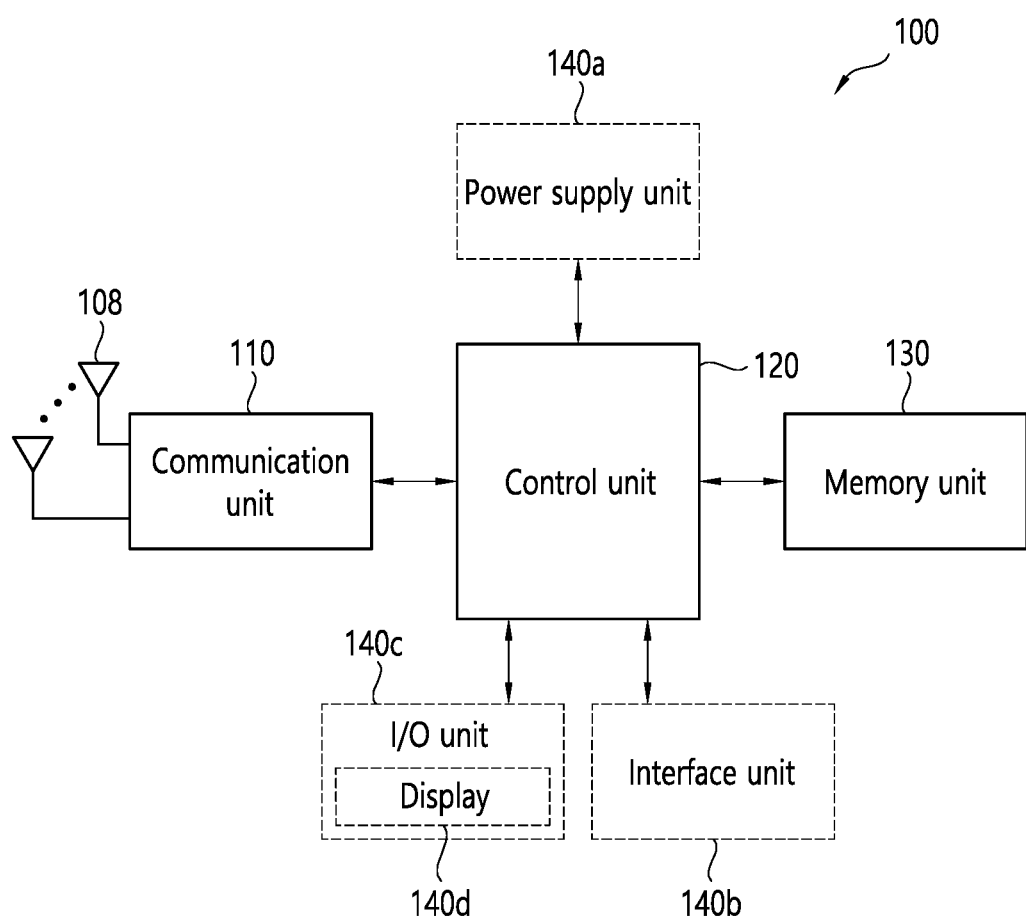
FIG. 35 illustrates a hand-held device that may be applied to the present disclosure.

FIG. 35 illustrates a hand-held device that may be applied to the present disclosure. The hand-held device may include a smartphone, a smart pad, a wearable device (for example, a smart watch or smart glass), and a portable computer (for example, a notebook computer). The hand-held device may be referred to as a Mobile Station (MS), a User Terminal (UT), a Mobile Subscriber Station (MSS), a Subscriber Station (SS), an Advanced Mobile Station (AMS), or a Wireless Terminal (WT).

Referring to FIG. 35, the hand-held device 100 may include an antenna unit 108, a communication unit 110, a control unit 120, a memory unit 130, a power supply unit 140a, an interface unit 140b, and an input/output unit 140c. The antenna unit 108 may be composed as part of the communication unit 110. Block 110-130/140a-140c correspond to the block 110-130/140 of FIG. 34, respectively.

The communication unit 110 may transmit and receive signals (for example, data and control signals) to and from other wireless devices and other base stations. The control unit 120 may control constituting elements of the hand-held device 100 to perform various operations. The control unit 120 may include an Application Processor (AP). The memory unit 130 may store data/parameters/programs/code/commands required to operate the hand-held device 100. Also, the memory unit 130 may store input/output data/information. The power supply unit 140a may supply power to the hand-held device 100 and may include a wired/wireless charging circuit and a battery. The interface unit 140b may support connection of the hand-held device 100 to other external devices. The interface unit 140b may include various ports (for example, audio input/output ports or video input/output ports) for connection to external devices. The input/output unit 140c may receive or output video information/signal, audio information/signal, data and/or information obtained from a user. The input/output unit 140c may include a camera, a microphone, a user input unit, a display unit 140d, a speaker, and/or a haptic module.

As one example, in the case of data communication, the input/output unit 140c may obtain information/signal (for example, touch, characters, voice, image, or video) received from the user and store the received information/signal into the memory unit 130. The communication unit 110 may convert the information/signal stored in the memory unit into a wireless signal; and may transmit the converted wireless signal directly to another wireless device or transmit the converted wireless signal to a base station. Also, after receiving a wireless signal from another wireless device or the base station, the communication unit 110 may restore the received wireless signal to its original information/signal. After being stored in the memory unit 130, the restored information/signal may be output in various forms (for example, characters, voice, image, video, or haptic display) through the input/output unit 140c.

Figure 36:
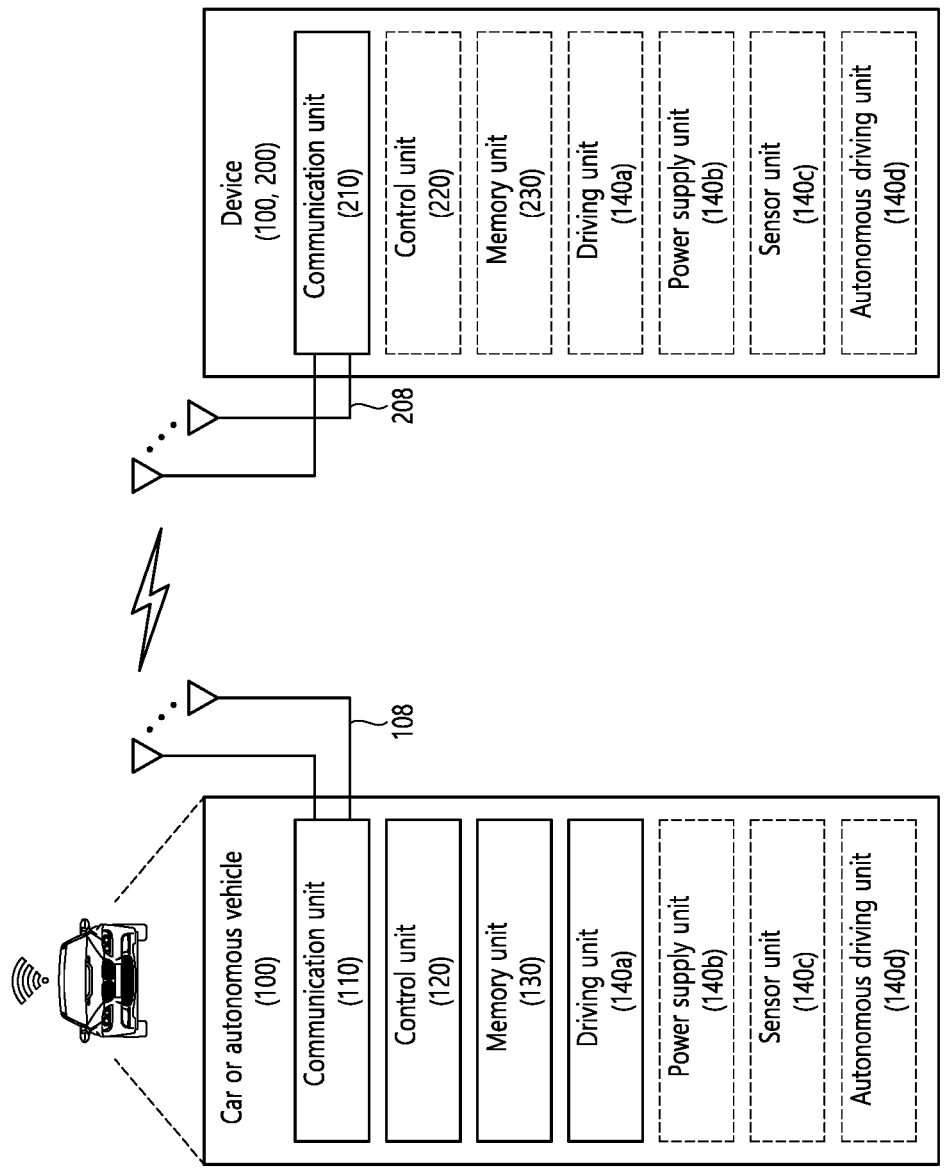
FIG. 36 illustrates a vehicle or a self-driving vehicle that may be applied to the present disclosure.

FIG. 36 illustrates a vehicle or a self-driving vehicle that may be applied to the present disclosure. The vehicle or self-driving vehicle may be implemented in the form of a mobile robot, a vehicle, a train, a manned/unmanned aerial vehicle (AV), or a ship.

Referring to FIG. 36, the vehicle or self-driving vehicle 100 may include an antenna unit 108, a communication unit 110, a control unit 120, a driving unit 140a, a power supply unit 140b, a sensor unit 140c, and an autonomous driving unit 140d. The antenna unit 108 may be composed as part of the communication unit 110. Block 110/130/140a-140d correspond to the block 110/130/140 of FIG. 34, respectively.

The communication unit 110 may transmit and receive signals (for example, data or control signals) to and from other vehicles or base stations (for example, a base station and a road-side unit). The control unit 120 may control constituting elements of the vehicle of self-driving vehicle 100 to perform various operations. The control unit 120 may include an Electronic Control Unit (ECU). The driving unit 140a enables the vehicle or self-driving vehicle 100 to drive on the road. The driving unit 140a may include an engine, motors, a power train, wheels, brakes, and a steering apparatus. The power supply unit 140b may supply power to the vehicle or self-driving vehicle 100 and may include a wired/wireless charging circuit and a battery. The sensor unit 140c may obtain a vehicle state, information on the surrounding environment, and user information. The sensor unit 140c may include an Inertial Measurement Unit (IMU) sensor, a collision sensor, a wheel sensor, a speed sensor, an inclination sensor, a weight detection sensor, a heading sensor, a position sensor, a vehicle forward/backward movement sensor, a battery sensor, a fuel sensor, a tire sensor, a steering sensor, a temperature sensor, a humidity sensor, an ultrasonic sensor, an illumination sensor, and a pedal position sensor. The autonomous driving unit 140d may implement a driving-lane keeping technique, a technique automatically adjusting the vehicle speed such as adaptive cruise control, a technique following a predetermined path, and a navigation technique automatically configuring a driving path after a goal position is set.

As one example, the communication unit 110 may receive map data and traffic information data from an external server. The autonomous driving unit 140d may generate an autonomous driving path and a driving plan based on the obtained data. The control unit 120 may control the driving unit 140a (for example, control of vehicle speed/direction) so that the vehicle or self-driving vehicle 100 may drive along the autonomous driving path according to the driving plan. During autonomous driving, the communication unit 110 may obtain the newest traffic information data from an external server periodically/non-periodically and obtain traffic information data of the surroundings from nearby vehicles. Also, during autonomous driving, the sensor unit 140c may obtain information on the vehicle state and information on the surrounding environment. The autonomous driving unit 140d may update the autonomous driving path and the driving plan based on the newly obtained data/information. The communication unit 110 may transmit information on the vehicle position, the autonomous driving path, and the driving plan to an external server. Based on the information collected from vehicles or self-driving vehicles, the external server may predict traffic information data using AI techniques and provide the predicted traffic information data to the vehicles or self-driving vehicles.

What is claimed is:

1. A discontinuous reception (DRX) method in a wireless communication system, the method performed by a user equipment (UE) and comprising:
   receiving a wake-up signal from a network; and
   performing Physical Downlink Control Channel (PDCCH) monitoring based on the wake-up signal,
   wherein the UE is configured with a plurality of cells,
   wherein the wake-up signal is received on a primary cell among the plurality of cells, and wherein the wake-up signal informs of a secondary cell, among the plurality of cells, on which the PDCCH monitoring is performed by the UE.

2. The method of claim 1, wherein a sequence of the wake-up signal is different depending on the secondary cell informed by the wake-up signal.

3. The method of claim 2, wherein the sequence is determined based on a synchronization signal block (SSB) index and a half frame number.

4. The method of claim 3, wherein the sequence is determined based on a variable determined based on the SSB index and the half frame number, and
   wherein the variable is pre-defined.

5. The method of claim 3, wherein the sequence is determined based on a variable determined based on the SSB index and the half frame number, and
   wherein information related to the variable is received by the UE from the network.

6. The method of claim 2, wherein the sequence is determined based on a physical cell identifier.

7. The method of claim 1, wherein a sequence of the wake-up signal is determined based on a sequence of a demodulation reference signal (DMRS) of a physical broadcast channel (PBCH).

8. The method of claim 1, wherein a sequence of the wake-up signal is determined based on a sequence of a channel state information-reference signal (CSI-RS).

9. The method of claim 1, wherein the wake-up signal is UE-specific.

10. The method of claim 9, wherein a time-frequency resource to which the wake-up signal is allocated is different for each UE.

11. The method of claim 1, wherein the UE performs wake-up signal monitoring before entering an on-duration period, and
    wherein based on the wake-up signal being received based on the wake-up signal monitoring, the PDCCH monitoring is performed in the on-duration period related to the wake-up signal.

12. A User Equipment (UE) comprising:
    at least one transceiver transmitting and receiving a wireless signal; and
    at least one processor operating by being combined with the transceiver,
    wherein the at least one processor is configured to:
    receive a wake-up signal from a network; and
    perform Physical Downlink Control Channel (PDCCH) monitoring based on the wake-up signal,
    wherein the UE is configured with a plurality of cells,
    wherein the wake-up signal is received on a primary cell among the plurality of cells,
    wherein the wake-up signal informs of a secondary cell, among the plurality of cells, on which the PDCCH monitoring is performed by the UE.

13. The UE of claim 12, wherein the UE communicates with at least one of a mobile terminal, a network, and a self-driving vehicle other than the UE.

* * * * *